US012229662B2

(12) United States Patent
Du et al.

(10) Patent No.: US 12,229,662 B2
(45) Date of Patent: Feb. 18, 2025

(54) ALL OPTICAL NEURAL NETWORK

(71) Applicant: The Hong Kong University of Science and Technology, Hong Kong (CN)

(72) Inventors: Shengwang Du, Hong Kong (CN); Junwei Liu, Hong Kong (CN); Ying Zuo, Hong Kong (CN); Bohan Li, Hong Kong (CN); Yujun Zhao, Hong Kong (CN); Yue Jiang, Hong Kong (CN); Peng Chen, Shanghai (CN); You-Chiuan Chen, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 1208 days.

(21) Appl. No.: 16/848,525

(22) Filed: Apr. 14, 2020

(65) Prior Publication Data

US 2020/0327403 A1 Oct. 15, 2020

Related U.S. Application Data

(60) Provisional application No. 62/834,005, filed on Apr. 15, 2019.

(51) Int. Cl.
*G06N 3/067* (2006.01)
*G02B 27/12* (2006.01)
(Continued)

(52) U.S. Cl.
CPC ........... *G06N 3/0675* (2013.01); *G02B 27/12* (2013.01); *G02F 1/3515* (2013.01); *G06N 3/04* (2013.01); *G02F 2203/01* (2013.01); *G06N 3/08* (2013.01)

(58) Field of Classification Search
CPC .................................................. G06N 3/0675
See application file for complete search history.

(56) References Cited

U.S. PATENT DOCUMENTS 5,004,309 A * 4/1991 Caulfield ............... G06N 3/067
359/107
5,276,636 A * 1/1994 Cohn ..................... G06E 3/005
359/561
(Continued)

FOREIGN PATENT DOCUMENTS

CN 109343363 A 2/2019
WO WO 2017/210550 A1 12/2017

OTHER PUBLICATIONS

Harris et al., "Nonlinear optical processes using electromagnetically induced transparency", 1990, American Physical Society, Phys. Rev. Lett., v. 64, issue 10, pp. 1107-1110 (Year: 1990).*
(Continued)

*Primary Examiner* — James D. Rutten
(74) *Attorney, Agent, or Firm* — LEYDIG, VOIT & MAYER, LTD.

(57) ABSTRACT

An all-optical neural network that utilizes light beams and optical components to implement layers of the neural network is disclosed herein. The all-optical neural network includes an input layer, zero or more hidden layers, and an output layer. Each layer of the neural network is configured to simulate linear and nonlinear operations of a conventional artificial neural network neuron on an optical signal. In an embodiment, the optical linear operation is performed by a spatial light modulator and an optical lens. The optical lens performs a Fourier transformation on the set of light beams and sums light beams with similar propagation orientations. The optical nonlinear operation is implemented utilizing a nonlinear optical medium having an electromagnetically induced transparency characteristic whose transmission of a probe beam of light is controlled by the intermediate output of a coupling beam of light from the optical linear operation.

17 Claims, 13 Drawing Sheets

(51) Int. Cl.
  G02F 1/35    (2006.01)
  G06N 3/04    (2023.01)
  G06N 3/08    (2023.01)

(56) References Cited

U.S. PATENT DOCUMENTS

| | | | |
|---|---|---|---|
| 5,428,711 A | 6/1995 | Akiyama et al. | |
| 5,497,253 A * | 3/1996 | Stoll | G06V 10/895 |
| | | | 382/156 |
| 10,268,232 B2 | 4/2019 | Harris et al. | |
| 2004/0175087 A1* | 9/2004 | Soljacic | G02F 1/35 |
| | | | 385/129 |
| 2010/0014134 A1* | 1/2010 | Cable | G03H 1/2205 |
| | | | 359/9 |
| 2011/0176190 A1* | 7/2011 | Golan | G03H 1/32 |
| | | | 359/9 |
| 2017/0351293 A1* | 12/2017 | Carolan | G02F 3/024 |
| 2019/0095784 A1* | 3/2019 | Crill | G06N 3/08 |
| 2020/0018334 A1 | 1/2020 | Le Mon et al. | |
| 2021/0056358 A1* | 2/2021 | Macfaden | G06N 3/04 |

OTHER PUBLICATIONS

P. W. M. Tsang and T.-C. Poon, "Review on the State-of-the-Art Technologies for Acquisition and Display of Digital Holograms," in IEEE Transactions on Industrial Informatics, vol. 12, No. 3, pp. 886-901, Jun. 2016 (Year: 2016).*
Zuo, Ying, et al., "All Optical Neural Network with Nonlinear Activation Functions",Physics Optica, vol. 6, Issue 9, pp. 1132-1137, (Apr. 24, 2019).
Zhang, S., "A dark-line two-dimensional magneto-optical trap of $^{85}$Rb atoms with high optical depth", Review of Scientific Instruments, 83, pp. 073102-1-073102-7, (2012).
Yang Zhen G., et al., "Gerchberg-Saxton and Yang-Gu algorithms for phase retrieval in a nonunitary transform system a comparison", Applied Optics, vol. 33, Issue 2, pp. 209-218, (1994).
Bueno, J., et al. "Reinforcement learning in a large-scale photonic recurrent neural network", Research Article, Optica, vol. 5, No. 6, pp. 756-760, (Jun. 2018).
Lin, Xing, et al., "All-optical machine learning using diffractive deep neural networks", Science, vol. 361, Issue 6406, pp. 1004-1008, (Sep. 7, 2018).
Jordan, M.I., et al., "Machine learning: Trends, perspectives, and prospects", Science, vol. 349, Issue 6245, pp. 255-260 (2015).
Sarma, S.D., et al., "Machine learning Meets Quantum Physics". Physics Today 72, 48 (2019).
Tait, Alexander N., et al., "Broadcast and Weight: An Integrated Network for Scalable Photonic Spike Processing", Journal of Lightwave Technology, vol. 32, No. 21:3427-3439, (Nov. 1, 2014).
Hamerly, Ryan, et al., "Large-Scale Optical Neural Networks Based on Photoelectric Multiplication", Physical Review X 9, pp. 021032-1-021032-12, (2019).
Mourgias-Alexandris, G., et al., "An all-optical neuron with sigmoid activation function", Optics Express, vol. 27, No. 7, pp. 9620-9630, (2019).
Peurifoy, J., et al., "Nanophotonic particle simulation and inverse design using artificial neural networks", Science Advances/Research Article, vol. 4, No. 6, eaar4206, pp. 1-7, (Jun. 1, 2018).
Larger, L., et al., "Photonic information processing beyond Turing: an optoelectronic implementation of reservoir computing", Optics Express, vol. 20, Issue 3, pp. 3241-3249, (2012).
Paquot, Y., et al., "Optoelectronic Reservoir Computing", Scientific Reports 2, Article No. 287, pp. 1-6, (2012).
Hughes, T.W., et al., "Training of photonic neural networks through in situ backpropagation and gradient measurement", Optica vol. 5, Issue 7, pp. 864-871, (2018).
Miscuglio, Mario, et al., :All-optical nonlinear activation function for photonic neural networks, Optical Materials Express, vol. 8, No. 12, pp. 3851-3863, (Dec. 1, 2018).

Peng, Hsuan-Tung, et al., "Neuromorphic Photonic Integrated Circuits", IEEE Journal of Selected Topics in Quantum Electronics, vol. 24, No. 6, pp. 1-15, (2018).
Biamonte, P., et al., "Quantum machine learning", Nature 549, pp. 195-202 (2017).
Butler, K.T., et al., "Machine learning for molecular and materials science", Nature 559, pp. 547-555 (2018).
Carleo, G., et al., "Machine learning and the physical sciences", Reviews of Moderan Physics, vol. 91, 39 pages, (Oct.-Dec. 2019).
Raccuglia, P., et al., "Machine-learning-assisted materials discovery using failed experiments", Nature 533, pp. 73-76, (2016).
Carrasquilla, J., et al., "Machine learning phases of matter", Nature Physics vol. 13, pp. 431-434, (Feb. 13, 2017).
Van Nieuwenburg, E.P., et al., "Learning phase transitions by confusion", Nature Physics, vol. 13, 435-439, (May 2017).
Carleo, G., et al., "Solving the quantum many-body problem with artificial neural networks", Science, vol. 355, Issue: 6325, pp. 602-606, (2017).
Liu, J., et al., "Self-learning Monte Carlo method", Physical Review, B 95, 041101 (Jan. 4, 2017).
Huang, L., et al., "Accelerated Monto Carlo simulations with restricted Boltzmann machines", Physical Review B 95, 035105 (Jan. 4, 2017).
Deng, D.L., et al., "Machine learning topological states", Physical Review B 96, 195145 (Nov. 22, 2017).
Liu, J. et al., "Self-learning Monte Carlo method and cumulative update in fermion systems", Physical Review B 95, 241104(R), (Jun. 7, 2017).
Zhang, Y., et al., "Quantum Loop Topography for Machine Learning", Physical Review Letters 118, 216401 (May 22, 2017).
Wang, C., et al., "Machine learning of frustrated classical spin models. I. Principal component analysis", Physical Review, B96, 144432 (Oct. 26, 2017).
Torlai, G., et al., "Neural-network quantum state tomography", Nature Physics, 14, pp. 447-450, (2018).
You, Yi-Zuang., et al., "Machine learning spatial geometry from entanglement features", Physical Review B 97, 045153 (Jan. 31, 2018).
Psaltis, D., et al., "Adaptive optical networks using photorefractive crystals", Applied Optics, vol. 27, Issue 9, pp. 1752-1759 (1988).
Caulfield, H.J., et al., "Optical neural networks", Proceedings of the IEEE, vol. 77, Issue 10, pp. 1573-1583, (1989).
Lu, Tauwei, et al., Self-organizing optical neural network for unsupervised learning:, Optical Engineering 29, 1107 (1990).
Jutamulia, S., et al., "Overview of hybrid optical neural networks", Optics & Laser Technology, vol. 28, Issue 2, pp. 59-72, (Mar. 1996).
Fleischhauer M., et al., "Electromagnetically induced transparency: Optics in coherent media", Reviews of Modern Physics, vol. 77, 633 (Jul. 12, 2005).
Feldmann, J., et al., "All-optical spiking neurosynaptic networks with self-learning capabilities", Nature 569(7755 (May 8, 2019).
Shen, Yichen, et al., "Deep Learning with Coherent Nanophotonic Circuits", Nature Photon 11.7 441-446, (Jun. 12, 2017).
Harris, S.E., "Electromagnetically Induced Transparency", Phys, Today 50, 36 (Jul. 1997).
Gerchberg, R.W., "Holography without Fringes in Electron Microscope". Nature, vol. 240, 3 pages, (Dec. 15, 1972).
Deng, D.L., et al., "Quantum Entanglement in Neural Network States", Physical Review X 7, 0241021 (2017).
Woods, D., et al., "Photonic neural networks", Nature Physics, vol. 8, pp. 257-259, (Apr. 2012).
Maren, A.J., et al., "Handbook of neural computing applications" Academic Press, (2014)—Chapter 1 through Chapter 2, (47 pages).
Maren, A.J., et al., "Handbook of neural computing applications" Academic Press, (2014)—Chapter 3 through Chapter 4, (29 pages).
Maren, A.J., et al., "Handbook of neural computing applications" Academic Press, (2014)—Chapter 5 through Chapter 7, (46 pages).
Maren, A.J., et al., "Handbook of neural computing applications" Academic Press, (2014)—Chapter 8 through Chapter 9, (34 pages).
Maren, A.J., et al., "Handbook of neural computing applications" Academic Press, (2014)—Chapter 10 through Chapter 12, (61 pages).

(56) References Cited

OTHER PUBLICATIONS

Maren, A.J., et al., *"Handbook of neural computing applications" Academic Press*, (2014)—Chapter 13 through Chapter 16, (66 pages).

*"Handbook of neural computing applications" Academic Press*, (2014)—Chapter 17 through Chapter 20, (63 pages).

Maren, A.J., et al., Maren, A.J., et al., *"Handbook of neural computing applications" Academic Press*, (2014)—Chapter 21 through Chapter 23, (53 pages).

Maren, A.J., et al., *"Handbook of neural computing applications" Academic Press*, (2014)—Chapter 24 through Chapter 28, (45 pages).

Abu-Mostafa, Y., et al. *"Optical Neural Computers", Scientific American*, vol. 256, No. 3, pp. 88-95, (March).

\* cited by examiner

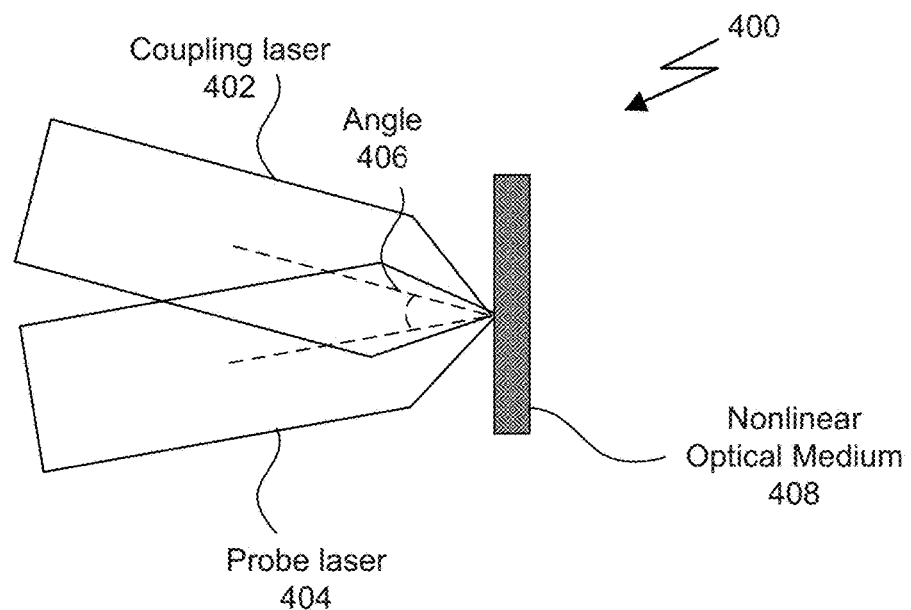
*Fig. 4A*
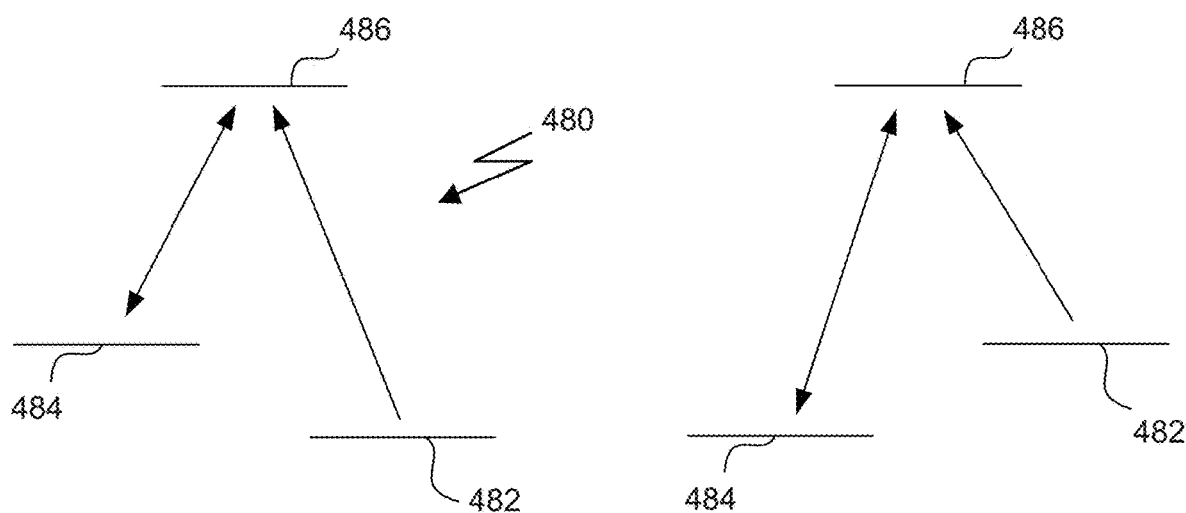
*Fig. 4B*  *Fig. 4C*

ALL OPTICAL NEURAL NETWORK

CLAIM OF PRIORITY

This application claims the benefit of U.S. Provisional Application No. 62/834,005 titled "ALL OPTICAL NEURAL NETWORK," filed Apr. 15, 2019, the entire contents of which is incorporated herein by reference.

TECHNICAL FIELD

The present disclosure relates to deep learning artificial neural networks. More specifically, the present disclosure is directed to an artificial neural network implemented with optical components to perform calculations using light as a medium.

BACKGROUND

Machine learning based on artificial neural networks (ANNs) has seen significant growth in the past decades. Machine learning provides general techniques for systems to learn from data and make decisions with minimal human intervention. As a machine learning algorithm, an ANN is a computational model based on the neural structure of a brain, where a collection of connected nodes called artificial neurons are implemented. With a large number of artificial neurons extensively interconnected, an ANN may function in a powerful way to perform complex tasks. Machine learning based on ANNs has been demonstrated to be powerful in various fields, such as image recognition, medical diagnosis, and machine translation. In scientific research fields, ANNs also show great potential, especially in discovering new materials, classifying phases of matter, representing variational wave functions, accelerating Monte Carlo simulations, and various other applications. Also, ANNs may be used to solve problems which are intractable in conventional approaches.

ANNs may be implemented by software simulations in electronic computers, where various complex algorithms may be applied. However, ANNs with a large number of artificial neurons and interconnections require huge computational resource requirements, such as high energy consumption and a long training time for a learning process. The complexity of the computation may increase exponentially as the scale of the neural network increases.

Hardware solutions to implement ANNs may be capable of dramatically decreasing execution time. For example, circuits built with transistors may perform intense computations by physical processes of summation of currents or charges. However, circuitry solutions are susceptible to noise and process-parameter variations, which may limit computational precision.

Photons as non-interacting bosons could be naturally used to realize multiple interconnections and simultaneous parallel calculations at the speed of light once they are employed in an implementation of an ANN. The key ingredient of an ANN are the artificial neurons, which perform both linear and nonlinear transformations on the signals. In hybrid optical neural networks (ONNs), optics has been used for implementing linear transformations. However, the nonlinear transformation functions are usually implemented electronically because implementing nonlinear transformation functions optically has proved challenging. Thus, there is a need to address this issue or other issues as optical neural networks are investigated.

SUMMARY

An all-optical neural network comprises an input layer, zero or more hidden layers, and an output layer. Each layer includes one or more optical neurons configured to process one or more beams of light as inputs to the optical neuron through a linear and nonlinear transformation. An activation signal of each optical neuron can be modulated by a set of weights associated with an interface between that layer of the neural network and a subsequent layer of the neural network. Both the linear transformation and the nonlinear transformation are processed by optical components and nonlinear optical medium. In particular, the nonlinear transformation is implemented by utilizing an electromagnetically induced transparency (EIT) characteristic of a nonlinear optical medium to control transmission of a second (probe) beam of light in accordance with a first (coupling) beam of light.

In a first aspect of the present disclosure, a system is disclosed for implementing an optical neuron. The system includes one or more beams of light as input for the optical neuron, a linear subsystem, a nonlinear subsystem, and one or more additional beams of light as output for the optical neuron. The light source is configured to generate one or more beams of light as input for the optical neuron. The linear subsystem is configured to perform an optical summation operation that combines the one or more beams of light to generate a coupling beam of light as an intermediate signal. The nonlinear subsystem is configured to perform an optical nonlinear operation based on the coupling beam of light to generate an activation response signal. The nonlinear subsystem includes a nonlinear optical medium that has an electromagnetically induced transparency (EIT) characteristic, and the activation response signal comprises a probe beam of light transmitted through the nonlinear optical medium that is nonlinearly controlled by the intermediate signal. The one or more additional beams of light are split from the activation response signal.

In some embodiments, the nonlinear subsystem comprises a probe laser configured to generate the probe beam of light directed at the nonlinear optical medium such that transmission of the probe beam of light through the nonlinear optical medium is controlled based on the coupling beam of light.

In some embodiments, the linear subsystem comprises an optical lens configured to perform a Fourier transform that combines the one or more beams of light to generate the intermediate signal. The optical lens generates at least two intermediate signals for two or more optical neurons by combining beams of light having similar propagating orientations. Each optical neuron corresponds to a particular propagating orientation, and each intermediate signal is located at a different location on a focal plane of the optical lens.

In some embodiments, the system further comprises a spatial light modulator (SLM) configured to modulate the one or more additional beams of light by a set of weights to generate one or more weighted beams of light as the output of the optical neuron.

In some embodiments, the SLM is tuned using a weighted Gerchberg-Saxton (GSW) algorithm. The system further includes a photosensor to measure the output from the SLM.

In some embodiments, the set of weights is learned by training a neural network based on a set of training data. The neural network includes an input layer, one or more hidden layers, and an output layer. The set of weights is associated with an interface between the input layer and a first hidden layer of the one or more hidden layers, a hidden layer of the one or more hidden layers and a subsequent hidden layer of the one or more hidden layers, or the hidden layer and the output layer.

In some embodiments, the transmission of the probe beam of light in the nonlinear optical medium is controlled by at least an intensity or a frequency of the coupling beam of light.

In some embodiments, the nonlinear optical medium comprises at least one of atoms, molecules, quantum dots, or solid-state materials.

In another aspect of the present disclosure, a system for implementing an all-optical neural network (AONN) is disclosed. The system includes an input layer including one or more optical neurons, zero or more hidden layers, and an output layer including one or more optical neurons. Each hidden layer includes one or more optical neurons.

In some embodiments, each optical neuron in the input layer includes one beam of light received as input to the optical neuron. In addition, each optical neuron in the output layer includes one beam of light transmitted as output of the optical neuron.

In some embodiments, the system is configured to implement a method for implementing the AONN. The method includes the steps of: generating one or more beams of light as input for the optical neurons in the input layer; performing optical linear operations on the outputs of the optical neurons in one layer to generate one or more beams of light as inputs to the optical neurons in a subsequent layer of the AONN; and performing optical nonlinear operations to generate nonlinear activation response signals for optical neurons. The optical nonlinear operations are implemented utilizing a nonlinear optical medium that has an electromagnetically induced transparency (EIT) characteristic In some embodiments, the method for implementing the AONN further comprises, for each optical neuron in a layer of optical neurons, modulating, utilizing a spatial light modulator (SLM), the activation response signal for the optical neuron by a set of weights to generate weighted output signals as inputs for a subsequent layer of the AONN.

In some embodiments, the method for implementing the AONN further comprises capturing the weighted output signals using a photosensor and configuring a light source to generate one or more additional beams of light in accordance with the weighted output signals to implement a subsequent layer of the AONN, wherein the subsequent layer is a hidden layer of the one or more hidden layers or the output layer.

In some embodiments, the one or more beams of light are generated by a spatial light modulator (SLM) configured to spatially modulate at least one of an amplitude and a phase of a coupling light beam incident a surface of the SLM. In an embodiment, the SLM is tuned using a weighted Gerchberg-Saxton (GSW) algorithm.

In some embodiments, a probe light beam is directed at the nonlinear optical medium such that transmission of the probe light beam through the nonlinear optical medium is controlled based on the coupling beam of light. A power of a portion of the probe light beam transmitted through the nonlinear optical medium corresponds to the activation response signal.

In some embodiments, the optical linear operations are performed, at least in part, by an optical lens configured to combine the one or more beams of light having similar propagating orientations on a focal plane of the optical lens.

In another aspect of the present disclosure, an apparatus is disclosed for modeling a neural network using beams of light and optical media. The apparatus includes: one or more beams of light; at least one optical component; a nonlinear optical medium; a probe beam of light; and one or more additional beams of light. The at least one optical component is configured to combine the one or more beams of light to generate a coupling beam of light as an intermediate signal. The nonlinear optical medium has an electromagnetically induced transparency (EIT) characteristic that is controlled in accordance with the intermediate signal. The probe beam of light is directed at the nonlinear optical medium such that transmission of the probe beam of light through the nonlinear optical medium is controlled based on the coupling beam of light.

In some embodiments, the at least one optical component includes at least one of a lens, a waveplate, or a diffraction grating.

In some embodiments, the neural network is modeled by iteratively simulating layers of the neural network such that weighted output signals for one or more optical neurons of a particular layer correspond with inputs to one or more optical neurons of a subsequent layer. Each layer comprises one or more optical neurons, and the neural network includes an input layer, zero or more hidden layers, and an output layer.

BRIEF DESCRIPTION OF THE DRAWINGS

FIG. 4A illustrates an optical nonlinear subsystem configured to implement a nonlinear operation within an optical medium, in accordance with some embodiments.

FIG. 4B depicts a corresponding A-shape energy level diagram of the nonlinear optical medium, in accordance with an embodiment.

FIG. 4C depicts a corresponding A-shape energy level diagram of the nonlinear optical medium, in accordance with another embodiment.

DETAILED DESCRIPTION

A layer of artificial neurons can be simulated in an optical path using optical components to perform linear and nonlinear transformations within an optical medium. The linear transformation can be performed by modulating the light amplitude or phase at various locations of the signal (e.g., multiplying components of the input signal by weights) and then combining the modulated light signal to implement a linear summation (e.g., combining weighted components to produce a weighted sum). Different optical neurons of the layer can be implemented using different diffraction gratings to separate the components of the input signal according to the various optical neurons in the layer. The optical nonlinear transformation can be performed by tuning a nonlinear optical medium to have an electromagnetically induced transparency (EIT) characteristic that has similar function, when illuminated by the output of the linear transformation, to that of a traditional activation function. In other words, a coupling light beam that represents the output of the linear transformation energizes the nonlinear optical medium such that a probe light beam can be transmitted through the nonlinear optical medium, in accordance with an energy of the coupling light beam.

An all-optical neural network can be designed such that both linear and nonlinear operations are implemented optically, in contrast with hybrid optical neural networks that may perform a linear combination optically before digitizing the intermediate result to apply the nonlinear transformation in a conventional electronic or software implementation of the neural network. This also allows for more complex optical neural networks to be implemented with multiple layers in series such that the output of the neural network is available at the speed of light. For example, a light path can be designed with two or more instances of the layer of artificial neurons simulated by alternating different linear and nonlinear subsystems along the path. As light propagates through the path, the output of one layer is processed by the next layer so on and so forth until the output of the final layer is produced, all without having to store intermediate results of hidden layers. Of course, other implementations can implement a single layer of artificial neurons that can be reconfigured over a plurality of passes in order to implement subsequent layers of the neural network. In such embodiments, each pass implements a different layer of the neural network and the optical image at the output of the layer is captured and reproduced for the subsequent pass.

Figure 1A:
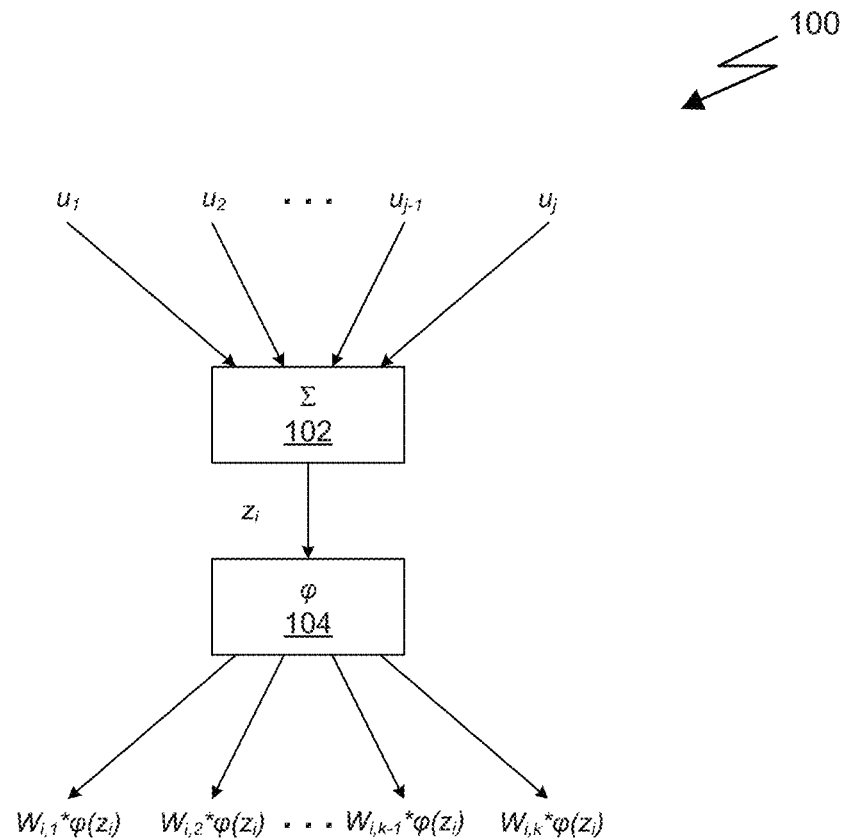
FIG. 1A illustrates an optical neuron, in accordance with some embodiments.

FIG. 1A illustrates an optical neuron 100, in accordance with some embodiments. The optical neuron includes a linear subsystem 102 and a nonlinear subsystem 104. The optical neuron 100 receives one or more input signals $u_j$ and combines the input signals to generate an intermediate output signal $z_i$. The input signals and the intermediate output signals are beams of light. The nonlinear subsystem 104 operates on the intermediate output signal $z_i$ and generates an activation response signal of the optical neuron $a_i = \varphi(z_i)$. The activation response signal is then transmitted to a subsequent layer of the neural network, with a separate and distinct weight $W_{i,k}$ applied to the activation response signal that corresponds with the destination optical neuron in the subsequent layer of the neural network.

In an embodiment, the linear subsystem 102 is implemented as a summation that can be performed by one or more optical lens that combine separate and distinct beams of light for each of the one or more input signals. In other words, the linear subsystem 102 implements the equivalent function:

$$z_i = \Sigma u_j \quad \text{(Eq. 1)}$$

The nonlinear subsystem 104 operates on the intermediate output signal $z_i$ to generate a nonlinear output referred to as the activation response signal $\varphi(z_i)$. In one embodiment, the nonlinear transformation is implemented by utilizing a characteristic of a nonlinear optical medium based on energy state transitions of the nonlinear optical medium induced by an incident coupling light beam. The transmission of a probe light beam through the nonlinear optical medium controlled by a coupling light beam is referred to as electromagnetically induced transparency (EIT). In absence of a coupling light beam, the nonlinear optical medium is opaque and prevents transmission of a probe laser beam through the nonlinear optical medium. A coupling light beam corresponding to the output of the linear subsystem 102 is used to induce an energy transition in the nonlinear optical medium such that the nonlinear optical medium becomes transparent and permits the probe light beam to be transmitted through the nonlinear optical medium. The EIT characteristic is utilized to realize a nonlinear transformation in an optical medium that is similar to conventional activation functions implemented in software implementations of ANNs. Thus, the combination of linear and nonlinear subsystems in a single optical path enables a fully optical implementation of an ANN.

It will be generally understood by those of skill in the art that the basic structure of an optical neuron can vary from that shown in FIG. 1A. For example, in some embodiments, weights $W_{i,j}$ can be applied to the inputs $u_j$ coming into the neuron rather than the activation response signal $\varphi(z_i)$ transmitted from the neuron. As another example, the sum implemented by the linear subsystem 102 can include a bias value or a previous state of the optical neuron (e.g., for Recurrent Neural Network (RNN) implementations of the neural network) in addition to the one or more input signals.

Figure 1B:
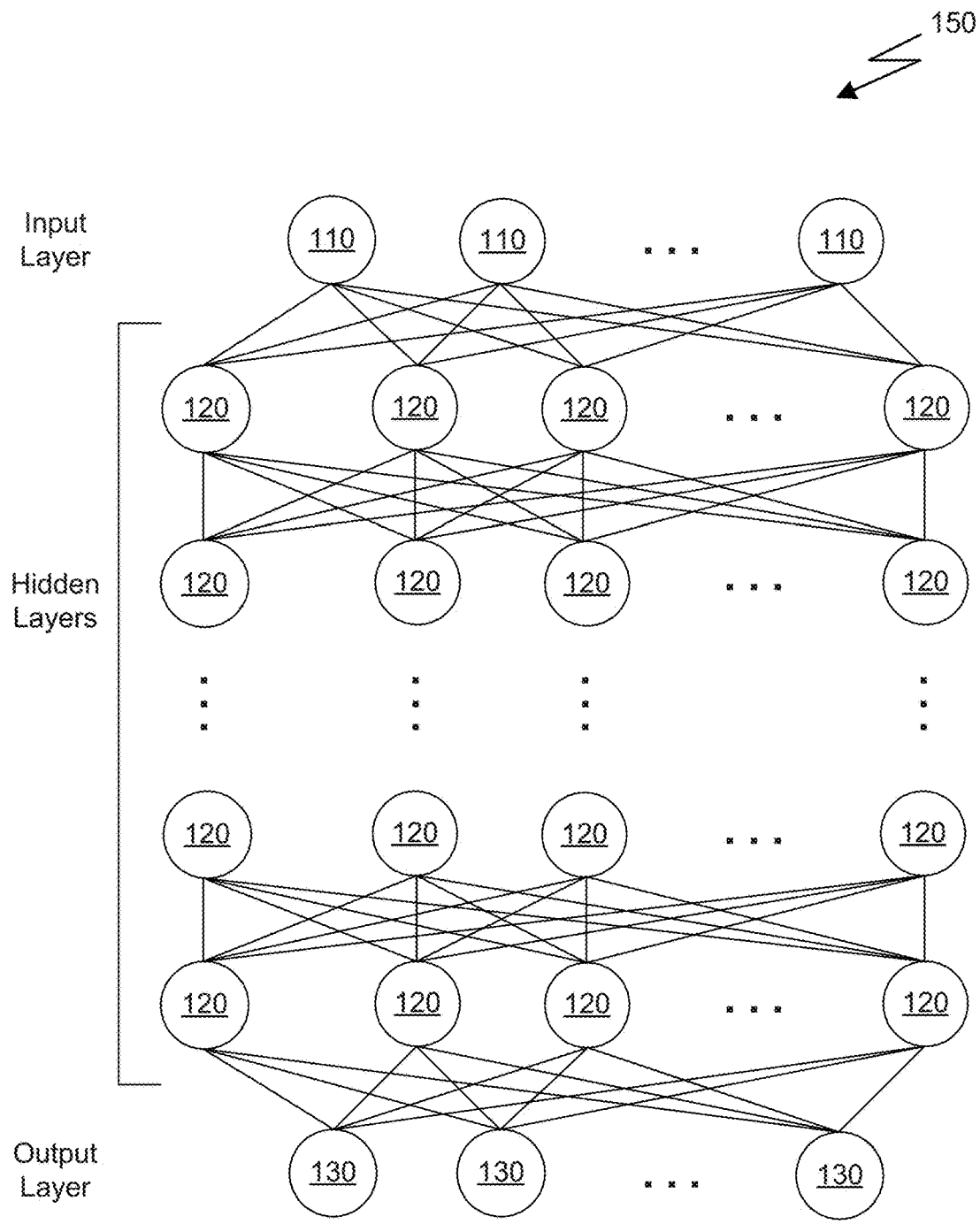
FIG. 1B illustrates a general layered optical neural network, in accordance with some embodiments.

FIG. 1B illustrates a general layered optical neural network 150, in accordance with some embodiments. The all-optical neural network (AONN) 150 comprises an input layer, zero or more hidden layers, and an output layer. Each layer comprises a plurality of optical neurons 110, 120 and 130 in the input layer, the hidden layer(s), and the output layer, respectively. Optical neurons 110 in the input layer differ from optical neurons 120 in the hidden layer(s) in that each optical neuron 110 has only one input signal $u_j$. Optical neurons 130 in the output layer differ from optical neurons 120 in the hidden layer(s) in that each optical neuron 130 has one output signal $\varphi(z_i)$. It will be appreciated that the number of optical neurons 110 in the input layer corresponds to the number of discrete input signals, and the number of optical neurons 130 in the output layer corresponds to the number of discrete output signals. Furthermore, the number of optical neurons 120 in each hidden layer can vary from hidden layer to hidden layer.

Figure 1C:
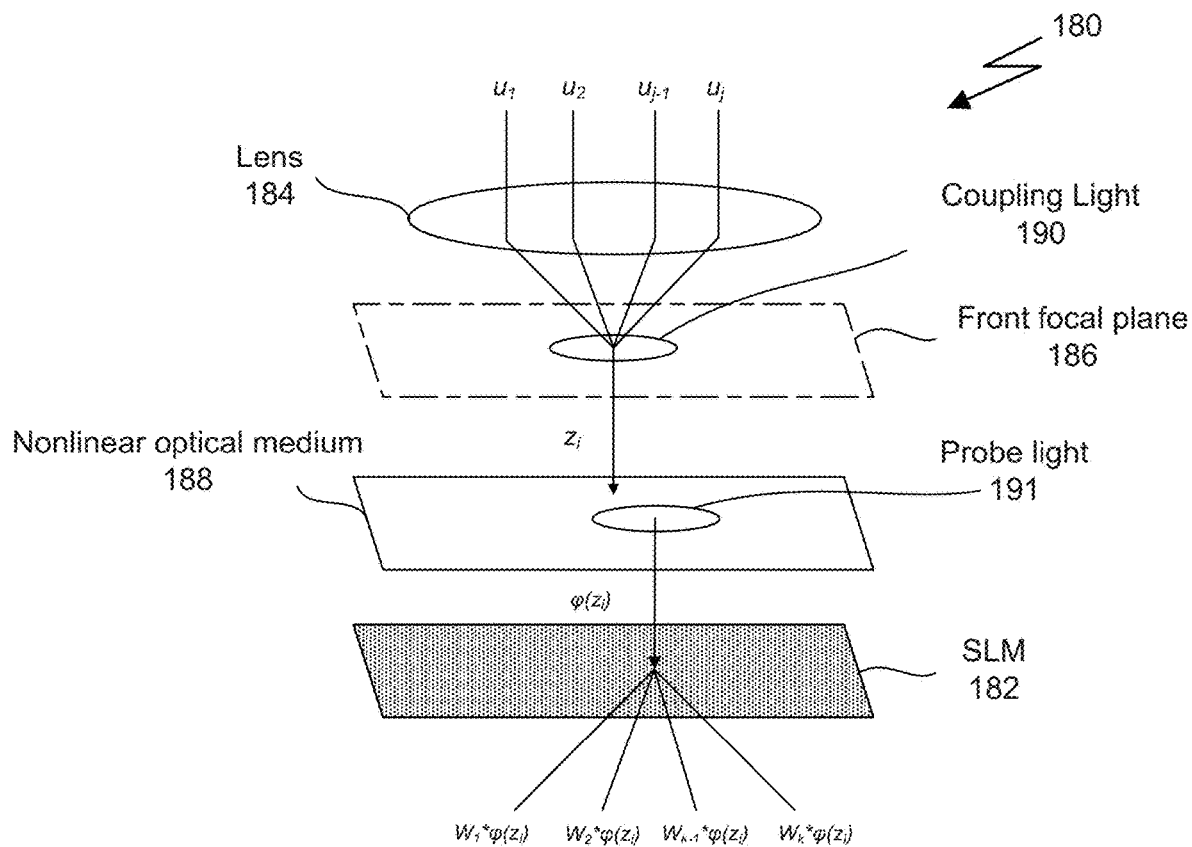
FIG. 1C illustrates a realization of an optical neuron utilizing a series of optical components, in accordance with some embodiments.

FIG. 1C illustrates a realization of an optical neuron 180 utilizing a series of optical components, in accordance with some embodiments. A linear summation operation transforms the coupling light beams 190 using an optical lens 184. As shown in FIG. 1C, the multiple light beams combine at a location on the focal plane 186 to create a combined intermediate beam that represents a sum from the multiple input light beams. It will be appreciated that more than one optical lens, or other optical elements, may be implemented in other embodiments to shape the incident light according to an optical system requirement.

The optical lens 184 sums the light beams having similar propagation orientation into one spot on its front focal plane 186. The size of the output spot is determined by the size of the input beams and the focal length of the optical lens 184. The interference from multiple beams modifies the spatial profile of the output spot. The power of the output spot is the integral over the spot area, which is a linear summation of the total powers of the interfering beams, in accordance with energy conservation.

As shown in FIG. 1C, the optical lens 184 performs a Fourier transform and sums all diffracted beams corresponding to the same propagation orientation onto a spot at its front focal plane 186 as the linear summation $z_i = \Sigma u_j$. At the front focal plane 186, there may be a plurality of light spots z presented on the plane 186 at different locations (x,y), each light spot corresponding to a different optical neuron in the layer.

Then, the combined intermediate output signal light beam incident the nonlinear optical medium 188 serves as the coupling light beam for the EIT of the nonlinear optical medium 188. A probe light beam 191 passes through the nonlinear optical medium, the transparency of which is controlled by the combined intermediate output signal light beam, and the transmitted probe light beam becomes the nonlinear activation response signal $\varphi(z_i)$.

A spatial light modulator (SLM) 182 is configured to spatially modulate the light beam of the activation response signal $\varphi(z_i)$ to split the activation response signal into one or more weighted light beams with different orientations. The SLM 182 may be programmable.

In an embodiment, the SLM 182 includes a plurality of light-modulating elements (pixels), which modulate the amplitude, phase and/or polarization of light incident thereon. Both transmissive and reflective SLMs can be implemented in the optical neuron 180. In some embodiments, the SLM includes a screen formed of micro display pixels, which are composed of liquid crystal molecules. By setting a voltage signal for each pixel, the orientation of the liquid crystal molecules of each pixel can be rotated relative to a fixed angle. In such embodiments, the amplitude of the incident light transmitted through or reflected by the different pixels of the SLM 182 can be modulated, based on the relative rotation of the liquid crystal molecules with one or more polarizing films (e.g., polarized glass substrates) located adjacent the liquid crystal molecules. In other embodiments, phase-only SLMs, such as liquid-crystal-on-silicon SLMs, are utilized in the optical setup to modulate a phase of the light transmitted or reflected by each pixel. By modulating a phase of light, different beams can be combined to act in constructive or destructive interference rather than modulating the amplitude of discrete coherent light sources directly.

In an embodiment, each pixel of the SLM 182 incorporates a phase grating (e.g., diffraction grating). Multiple phase gratings inside the SLM 182 modulate the incident light transmitted through each pixel to generate superimposed plane waves having different propagation orientations, where each orientation corresponds to a different optical neuron in a layer of the AONN 150. In this manner, more than one optical neuron can be modeled within the optical medium in the same light path.

In an embodiment, the SLM 182 is utilized to modulate the phase of the probe light 191. Given that the SLM 182 is placed on a xy plane while being illuminated by one or more beam(s), the complex amplitude of reflective or transmitted light is $E_p(x, y)e^{i(\phi_0 + \phi(x,y))}$, where $E_p(x, y)$ is the amplitude of the incident light, and $\phi_0$ is the phase of the incident light and $\phi(x, y)$ is the phase change induced by the SLM 182. The phase modulation $\phi$ of pixels in the SLM 182 can be controlled independently. In the embodiment of FIG. 1C, the complex amplitude of coupling light 190 at the back focal plane of lens 184 is $E_c(x,y)e^{i\Phi_c(x,y)}$, the intermediate output plane is at the front focal plane 186 of the lens 184. In this configuration, the lens 184 performs the linear transformation. The output complex amplitude of the beam at the front focal plane 186 is given in Equation 2 as $$E(x,y) = \mathcal{F}\{E_c(x,y)e^{i(\Phi_c(x,y))}\}. \quad \text{(Eq. 2)}$$

The phase modulation $\phi(x, y)$ is determined to satisfy the target profile $|E(x,y)|^2$ with predesigned weight coefficient $w_{ij}$. The initial phase profile setting $\phi(x, y)$ may be achieved by superposition of a plurality of different phase gratings, where a grating equation is utilized for calculation. The phase profile $\phi(x, y)$ is finely tuned by applying the weighted Gerchberg-Saxton (GSW) algorithm, which includes the following steps.

The target intensity of a field incident on the SLM is modeled as $I_0(x, y)$. During iteration, the electric field in the SLM plane $\sqrt{I_0}\, e^{i\Phi_n}$ is propagated through the effective lens using a fast Fourier transform (FFT) to calculate the field $A_n e^{i\Phi_n^f}$ in the focal plane. The output beam intensity can also be captured in reality (e.g., measured). If the difference between the target image intensity and measured intensity is small enough, the phase pattern can be used to drive the SLM; otherwise, the amplitude $A_n$ is replaced by the target amplitude with compensation factor $g_n$ to be $g_n\sqrt{I_t}$, where $g_n$ is an adaptive factor and defined as $$g_n = \delta \frac{\sqrt{I_t}}{\sqrt{I_m}} g_{n-1} + (1-\delta),\ g_1 = 1.$$

In the expression, $\delta$ is a feedback parameter ranging from 0 to 1 and $I_m$ is the measured intensity distribution. The field $g_n I_t e^{i\Phi_n^f}$ is then propagated back to the SLM plane by inverse FFT, giving the field $A_{n+1} e^{i\Phi_{n+1}}$ in the SLM plane. The calculated phase $\phi_{n+1}$ is kept as the new phase pattern in the SLM plane, while the amplitude is replaced by the incident one $\sqrt{I_0}$. Then another iteration begins with filed $\sqrt{I_0} e^{i\Phi_{n+1}}$.

Figure 2:
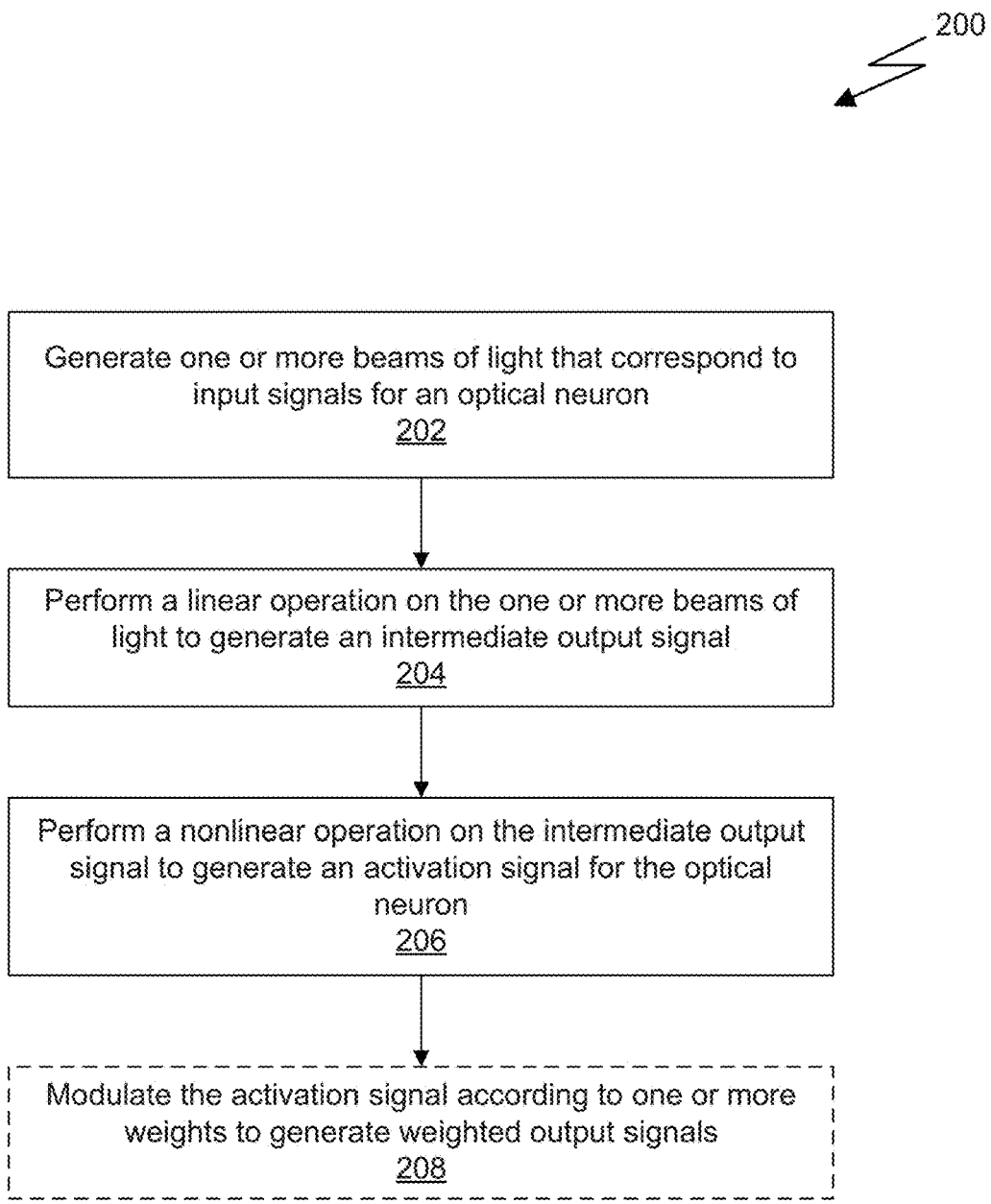
FIG. 2 illustrates a flowchart of a method for operating an optical neuron, in accordance with some embodiments.

FIG. 2 illustrates a flowchart of a method 200 for operating an optical neuron, in accordance with some embodiments. The steps of the method 200 are described in the context of software (e.g., instructions) being executed by a processor, processing unit, or any other controller or device capable of directing the operation of one or more of the components configured to model a layer of optical neurons in the all-optical neural network 150. However, in some embodiments, the steps can be performed by hardware or a combination of hardware and software, such as software executing on a processor that causes hardware to perform an operation (e.g., controlling an actuator or controlling the SLM, a coupling laser, and the like). Of course, it will be appreciated that any system capable of carrying out the steps of the method 200 is contemplated as being within the scope of the present disclosure.

At step 202, one or more beams of light are generated that correspond to input signals for the optical neuron. In an embodiment, an SLM is configured to modulate a coupling laser beam to generate a plurality of coherent light beams as the inputs to the optical neuron. In an embodiment, the plurality of coherent light beams represents the activation levels of a previous layer of optical neurons. The activation levels can be weighted according to the parameters of the AONN. In some embodiments, a single light beam or multiple light beams may be split into a plurality of coherent light beams, via optical components, and each separate light beam can be modulated by a first SLM to match the desired levels of the input signals.

At step 204, a linear operation is performed on the one or more beams of light. In accordance with some embodiments, the linear operation is implemented using one or more optical components including an optical lens, waveplates, diffraction gratings and/or other linear optical components and systems. The linear operation combines one or more light beams representing the inputs of the optical neuron to generate an intermediate output signal $z_i$.

At step 206, a nonlinear operation is performed on the intermediate output signal generated by the linear operation. In some embodiments, a nonlinear optical medium 188 is utilized to apply a nonlinear activation function to the optical signal. In some embodiments, the nonlinear activation functions are realized based on the EIT characteristic of the nonlinear optical medium, which is a coherent optical nonlinearity. The nonlinear operation typically involves two highly coherent light sources, such as lasers, which are tuned to interact with three quantum states of a material. In other embodiments, the nonlinear activation functions can also be realized by controlling the population of particles (such as atoms and molecules) in particular quantum or classical states. The nonlinear activation function results in an activation signal (e.g., output signal) for the optical neuron, which can be expressed as, $a_i = \varphi(z_i)$.

At step 208, the activation signal can be modulated according to one or more weights to generate weighted output signals that are passed to one or more optical neurons in a subsequent layer of the AONN. In some optical neurons, step 208 can be optional, such as the optical neurons in an output layer of the AONN.

It will be appreciated that steps 202 through 208 can be repeated for one or more layers of the AONN, passing the outputs of one layer to the inputs of a subsequent layer as defined by the structure of the AONN.

Figure 3:
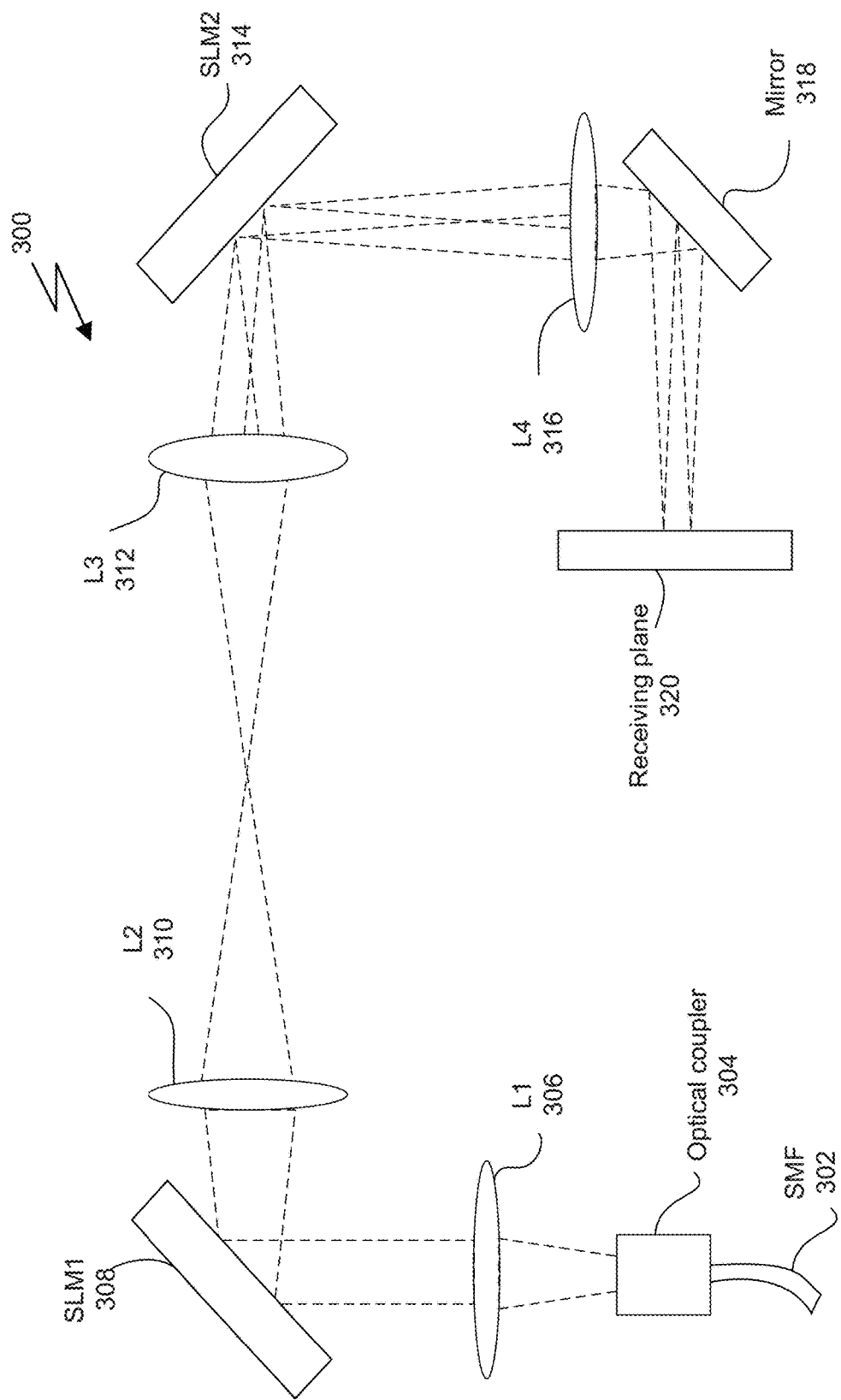
FIG. 3 illustrates an optical linear subsystem configured to implement a linear operation within an optical medium, in accordance with some embodiments.

FIG. 3 illustrates an optical linear subsystem 300 configured to implement an input layer generation and linear operation within an optical medium, in accordance with some embodiments. As depicted in FIG. 3, for purpose of illustration, an M-to-N operation is provided as an example. In other words, M input signals (e.g., M=8) are processed by a layer of optical neurons that includes N optical neurons to generate N intermediate output signals $z_i$ (e.g., N=4). In an embodiment, a coherent light source 302, such as a laser diode, gas laser, single mode fiber (SMF) laser, and the like emits a laser beam that propagates through an optical coupler 304 and is collimated through a collimation lens L1 306. The collimated laser light illuminates the surface of a first SLM, SLM1 308, where the incident light is selectively reflected from pixels of SLM1 308 to generate M separate beams of light representing the M input signals. The pattern encoded on SLM1 308 can be the combination of different orientation diffraction gratings. Each pixel can be used to modulate the amplitude, phase, and/or polarization of the reflected beams such that each beam represents an activation level of an input signal provided to the layer of optical neurons.

The M beams propagate through a 4-f optical lens system (depicted as two lenses L2 310 and L3 312 in the embodiment in FIG. 3) with an aperture in the focal point to block the undesired beam, and are imaged on a second SLM, SLM2 314. The stray light from the first SLM1 308 is blocked at the Fourier plane of L2 310. Each laser beam is imaged on (e.g., directed to) a certain part of the SLM2 314, where each part corresponds with a different optical neuron of the layer of optical neurons. Each SLM part can modulate the light such that a different weight $w_{ij}$ is applied to the same input signal, where the weights $w_{ij}$ corresponds to the different optical neurons.

In an embodiment, each laser beam incident on N separate parts of the SLM2 314 is diffracted into plane waves of N different orientations corresponding to the N modeled optical neurons. Plane waves of similar orientation are summed, through constructive or destructive interference by the Fourier transform to generate N beams output on the back side of optical lens L4 316, which are reflected by the mirror 318 onto the receiving plane 320. In this embodiment, a mirror 318 is placed in the light path to direct the laser beams to a receiving plane 320 to form an image of the output beams, wherein the receiving plane 320 is placed at the effective focal plane of L4 316.

It will be appreciated that the optical components of FIG. 3 can be changed in different embodiments. For example, the mirror 318 can be omitted from the system and the receiving plane 320 can be located at the back focal plane of the optical lens L4 316. In addition, the input signals can be generated by different light sources, separately modulated, rather than splitting a single beam into M separate beams using the SLM1 308. For example, a backlight array can be placed behind the SLM2 314, where the backlight array includes a plurality of different light sources used to illuminate one or more pixels, each light source representing a different input signal. However, care must be taken to generate coherent (e.g., in-phase) light from all of the separate light sources, which may require the ability to tune the light sources.

In some embodiments, the receiving plane 320 includes a photosensor (e.g., CCD sensor, CMOS sensor, etc.), digital camera, or the like for imaging the image transmitted through the optical lens L4 316. The image can then be used to generate an input to a nonlinear subsystem. Alternatively, the receiving plane 320 can be replaced with a system or component that performs the nonlinear transformation directly based on the output beams.

FIG. 4A illustrates an optical nonlinear subsystem 400 configured to implement a nonlinear operation within an optical medium 408, in accordance with some embodiments. A coupling beam 402 represents the intermediate output signal generated for an optical neuron by the optical linear subsystem 300, and a probe beam 404 realizes a nonlinear transformation of the intermediate output signal based on the transparency of the nonlinear optical medium 408 induced by the coupling beam 402. The angle 406 between the coupling beam 402 and the probe beam 404 can be varied from 0 to 360 degrees. In an embodiment, the nonlinear optical medium 408 is cold atoms of a particular element, such as laser-cooled Rubidium atoms ($^{85}$Rb). In one example, the Rubidium atoms are laser cooled to a temperature of about 0.00001 to 0.0001 Kelvin. In other embodiments, the nonlinear optical medium 408 can include hot atoms (e.g., atoms at approximately room temperature or above), or some other medium that can be used to implement the optical nonlinear transformation. In other embodiments, the EIT nonlinear activation functions can be achieved in quantum dots and other solid-state materials.

FIG. 4B depicts a corresponding Λ-shape energy level diagram of the nonlinear optical medium 408, in accordance with an embodiment. As depicted in FIG. 4B, the relative energies $E_1$, $E_2$ and $E_3$ of the states $|1\rangle$ (482), $|2\rangle$ (484) and $|3\rangle$ (486), where $E_1<E_2<E_3$, are shown for illustrating energy transitions between the states. The particles of the nonlinear optical medium 408 are prepared in the state 482. The coupling laser beam 402, from the optical linear subsystem 300, operates to effect a transition between state $|2\rangle$ (484) and state $|3\rangle$ (486). The probe laser beam 404, operates to effect a transition between state $|1\rangle$ (482) and state $|3\rangle$ (486). The transmission of the probe laser beam 404 through the nonlinear optical medium 408 is controlled by the power of the coupling laser beam 402. In absence of the coupling beam 402, the particles in the nonlinear optical medium 408 are opaque to the probe laser beam 404. While in presence of the coupling beam 402, the quantum interference between the transition paths leads to an EIT transparency spectral window, wherein the peak transmission and the bandwidth are controlled by the coupling laser 402 intensity (e.g., the output signal from the linear subsystem). The probe laser beam 404 output is given in Equation 3 as $$I_{p,out} = I_{p,in} \exp\left[-OD\frac{4\gamma_{12}\gamma_{13}}{\Omega_c^2+4\gamma_{12}\gamma_{13}}\right] = \varphi(\Omega_c^2) \quad \text{(Eq. 3)}$$

where $I_{p,in}$ and $I_{p,out}$ are the input coupling laser beam 402 and output probe laser beam 404 intensities, OD is the nonlinear optical medium depth on the $|1\rangle$-$|3\rangle$ (482 to 486) transition, and $\gamma_{ij}$ is the dephasing rate between the states $|i\rangle$-$|j\rangle$. $\Omega_c$ is the coupling field Rabi frequency and its square is proportional to the coupling laser intensity ($\Omega_c^2 \propto I_c$). As shown in Equation 3, the probe laser beam 404 intensity is nonlinearly controlled by the coupling beam intensity. The nonlinear activation function $\varphi$ is achieved by taking the coupling laser beam 402 intensity as the input and the transmitted probe laser beam 404 intensity as the output. Equation 3 indicates that the nonlinear activation function is determined by OD and $\gamma_{12}$.

FIG. 4C depicts another corresponding Λ-shape energy level diagram of the nonlinear optical medium 408, in accordance with another embodiment. The relative energies $E_1$, $E_2$ and $E_3$ of the states $|1\rangle$ (482), $|2\rangle$ (484) and $|3\rangle$ (486), where $E_2<E_1<E_3$, are shown in FIG. 4C. In contrast with the energy level diagram of FIG. 4B, the transition between state $|2\rangle$ (484) and state $|3\rangle$ (486) requires more energy than the transition between state $|1\rangle$ (482) and state $|3\rangle$ (486).

Figure 4D:
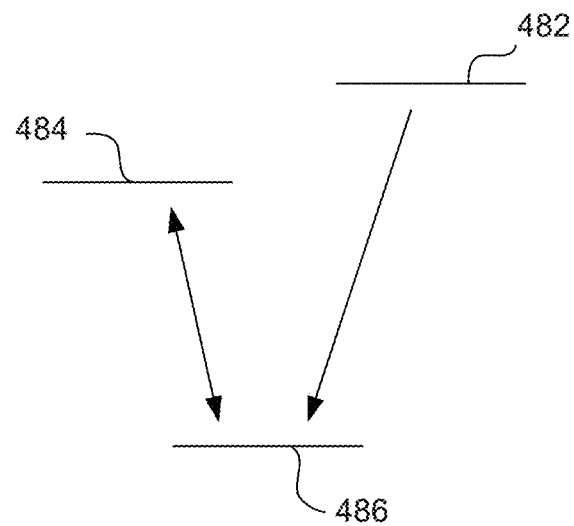
FIG. 4D depicts a corresponding V-shape energy level diagram of the nonlinear optical medium, in accordance with an embodiment.

FIG. 4D depicts a corresponding V-shape energy level diagram of the nonlinear optical medium 408, in accordance with an embodiment. The relative energies $E_1$, $E_2$ and $E_3$ of the states $|1\rangle$ (482), $|2\rangle$ (484) and $|3\rangle$ (486), where $\{E_2, E_1\}>E_3$, are shown in FIG. 4D. In contrast with the Λ-shape energy level diagrams of FIGS. 4B & 4C, the energies of the state $|1\rangle$ (482) and state $|2\rangle$ (484) are above the energy for state $|3\rangle$ (486), where the energy of state $|1\rangle$ (482) can be less than, equal to, or greater than the energy of state $|2\rangle$ (484) (e.g., $E_1<E_2$, or $E_1=E_2$, or $E_1>E_2$).

Figure 4E:
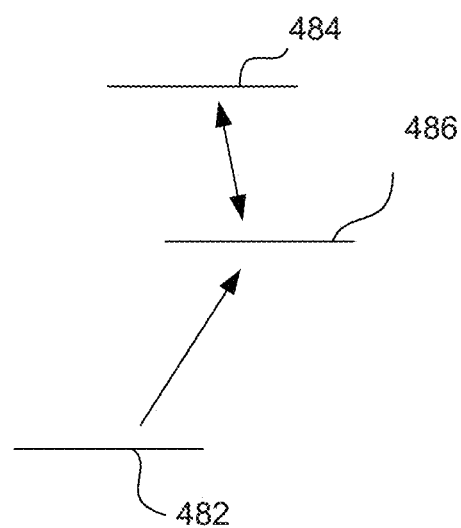
FIG. 4E depicts a corresponding ladder-shape energy level diagram of the nonlinear optical medium, in accordance with an embodiment.

FIG. 4E depicts a corresponding ladder-shape energy level diagram of the nonlinear optical medium 408, in accordance with an embodiment. The relative energies $E_1$, $E_2$ and $E_3$ of the states $|1\rangle$ (482), $|2\rangle$ (484) and $|3\rangle$ (486), where $E_1<E_3<E_2$, are shown in FIG. 4E. In contrast with the energy level diagrams of FIGS. 4B, 4C, and 4D, the transition between state $|2\rangle$ (484) and state $|3\rangle$ (486) is opposite in direction compared to the transition between state $|1\rangle$ (482) and state $|3\rangle$ (486).

Atomic systems in dilute gases, solid solutions, or more exotic states such as a magneto-optical trap or a Bose-Einstein condensate may be implemented as realizing the EIT characteristic. An EIT characteristic may be realized in electro-mechanical systems, opto-mechanical systems, or semiconductor nanostructures, such as quantum wells, quantum wires, quantum dots, and other solid-state materials, each of which could be incorporated into the nonlinear subsystem 400 to realize a nonlinear transformation within an optical medium.

Figure 5:
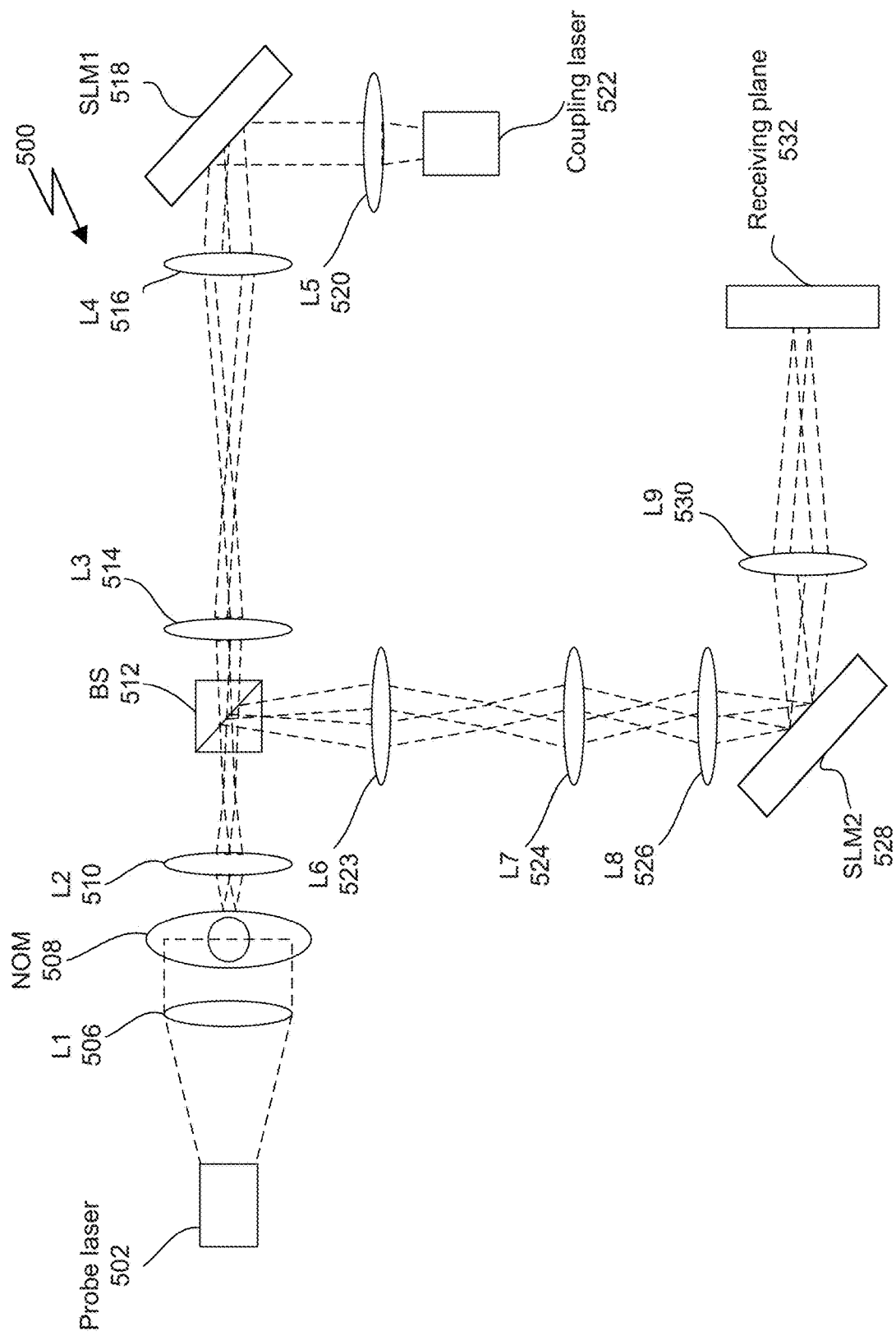
FIG. 5 illustrates a system configured to model an all-optical neural network, in accordance with some embodiments.

FIG. 5 illustrates a system 500 configured to model an all-optical neural network (AONN), in accordance with some embodiments. The system 500 is designed to model a layer of the neural network that includes N optical neurons that produce N output signals. Each of the N optical neurons is designed to receive M input signals. Each of the N outputs can be multiplied by K weights to produce N×K weighted output signals that can be propagated to a subsequent layer of the AONN.

An optical signal propagates along a light path through various optical components (sometimes referred to as optical operation units). A coupling laser beam 522 from a fiber coupler is projected through a collimating lens L5 520 onto a surface of SLM1 518, the surface divided into multiple subareas each subarea corresponding to one or more light-modulating elements. The SLM1 518 is configured to modulate the coupling laser beam 522 to generate the M×N input signals. The lens L4 516 operates as the linear subsystem 102 of the optical neuron by combining the M×N input signals into N intermediate output signals.

The N intermediate output signals then pass through lens L3 514, a beam splitter 512, and lens L2 510 before reaching the nonlinear optical medium 508. In an embodiment, the N intermediate output signals induce the nonlinear optical medium 508 to exhibit an EIT characteristic that modulates the probe laser beam 502 according to a nonlinear function. The probe laser beam 502 passes through a collimating lens L1 506 before striking the opposite side of the nonlinear optical medium 508 from the N intermediate output signals. The portion of the probe laser beam 502 that is transmitted through the nonlinear optical medium 508 passes through lens L2 510 and strikes the beam splitter 512, which redirects the probe laser beam 502 to a second SLM, SLM2 528. The portion of the probe laser beam 502 represents the activation signal for an optical neuron, and separate and distinct nonlinear optical mediums 508 can be implemented for the N optical neurons, thereby allowing for N separate and distinct activation signals corresponding to the N optical neurons. The probe laser beam 502 passes through lenses L6 523, L7 524 and L8 526 prior to striking the surface of SLM2 528.

The SLM2 528 is configured to modulate the N activation signals, each activation signal being modulated by K weights such that the K weighted activation signals correspond to K different optical neurons of a subsequent layer of the AONN. The N×K output signals from the SLM2 528 are directed through a lens 530 and focused on a receiving plane 532, where the signals can be captured and digitized by a photosensor or otherwise measured/recorded by any technically feasible technique for measuring light.

In an embodiment, a size of the beam directed at the surface of the SLM1 518 covers (e.g., overlaps or illuminates) multiple light-modulating elements. This enables a single light source to be modulated at different locations of the SLM1 518 to generate multiple input beams. Furthermore, each of the light-modulating elements in the SLM1 518 can be associated with a particular diffraction grating corresponding to one or more propagation orientations that allow for multiple optical neurons to be modeled in the same light path at the same time.

It will be appreciated that an AONN having an input layer, one or more hidden layers, and an output layer can be constructed by injecting the outputs of the system 500 at the receiving plane 532 as the modulated input signals generated at SLM1 518 during a subsequent pass of the system 500. Consequently, a control system can be used to configure the SLM1 518 and SLM2 528 to process the inputs through each layer of the AONN, sequentially, in order to generate the outputs of the output layer of the AONN after a number of passes through the system 500.

Figure 6:
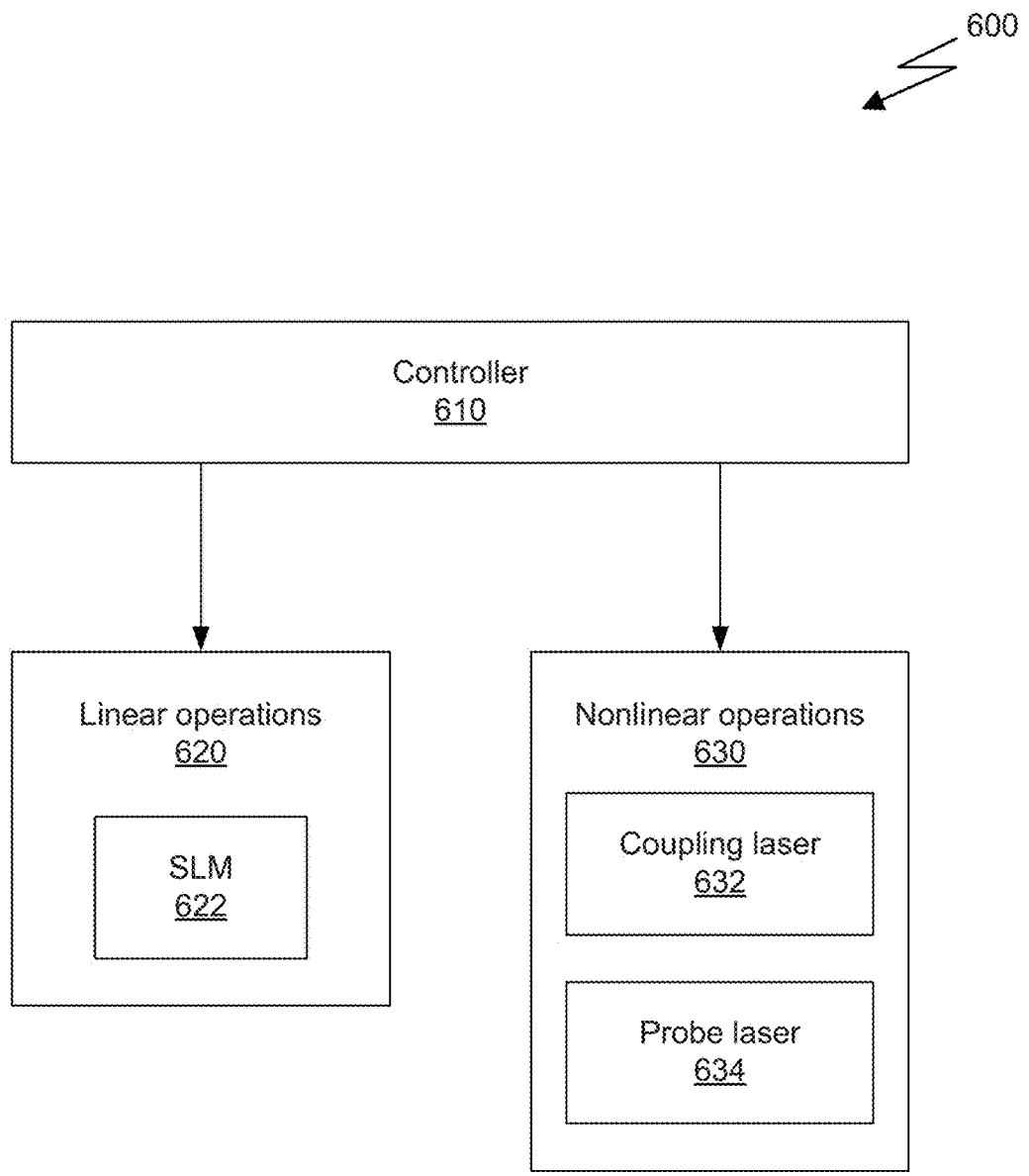
FIG. 6 illustrates a control system configured to operate the optical system to model the all-optical neural network, in accordance with some embodiments.

FIG. 6 illustrates a control system 600 configured to operate the optical system 500 to model an all-optical neural network, in accordance with some embodiments. As shown in FIG. 6, a controller 610 may be implemented in the optical system to control and tune the optical components for performing linear operations and nonlinear operations. Instructions may be executed by the controller 610 to carry out the control and tuning of the optical system.

As an example, the linear operations 620 are implemented by lenses associated with an SLM, SLM1 622, that corresponds to SLM1 518 in the system 500. The controller 610 generates a signal transmitted to the SLM 622 in order to adjust the light-modulating elements in the SLM 622 to encode the input signals processed by the linear operation, and the SLM 622, upon decoding the signal, adjusts the voltage applied to each light-modulating element in accordance with the decoded signal. In some embodiments, images formed by the SLM may be sampled using, e.g., movable mirrors and photosensors to provide a feedback loop for ensuring an accuracy of the input signals combined in the linear operation. The images can be fed back to the controller 610 in order to tune the light-modulating elements using a weighted Gerchberg-Saxton (GSW) algorithm.

In some embodiments, the nonlinear operations 630 are implemented by one or more components associated, as an example, with the nonlinear optical medium 508, such as by adjusting the intensities of coupling laser beam 632 to control the output of the probe laser beam 634. The controller 610 can be configured to generate control signals for each of these various components in order to implement the nonlinear transformation utilizing the nonlinear optical medium 508. It will be appreciated that there may be other optical components/sub-systems being controlled by the controller, such as adjustable optics (e.g., flip-mirrors, adjustable lenses, etc.) or cameras (e.g., photosensors and optical components) to capture images with certain exposure settings. In addition, although not shown explicitly in FIG. 6, the controller can also provide control signals to a second SLM, such as SLM2 528, for applying weights to the activation signals for one or more optical neurons.

The controller 610 can be implemented using software (i.e., instructions stored in a memory or other computer-readable media) executed by a processor such as a central processing unit (CPU), a digital signal processor (DSP), a microcontroller, an embedded processor, or the like. In other embodiments, the controller 610 can be implemented in hardware, such as within an application-specific integrated circuit (ASIC) or a field programmable gate array (FPGA). In other embodiments, the controller 610 can be implemented in any combination of software and/or hardware. In some embodiments, the hardware can include mechanical and/or electro-mechanical actuators such as stepper motors, hydraulic or pneumatic cylinders, and the like. Any type of control system 600 for managing the operation of one or more components that comprise the AONN is contemplated as being within the scope of the present disclosure.

Figure 7:
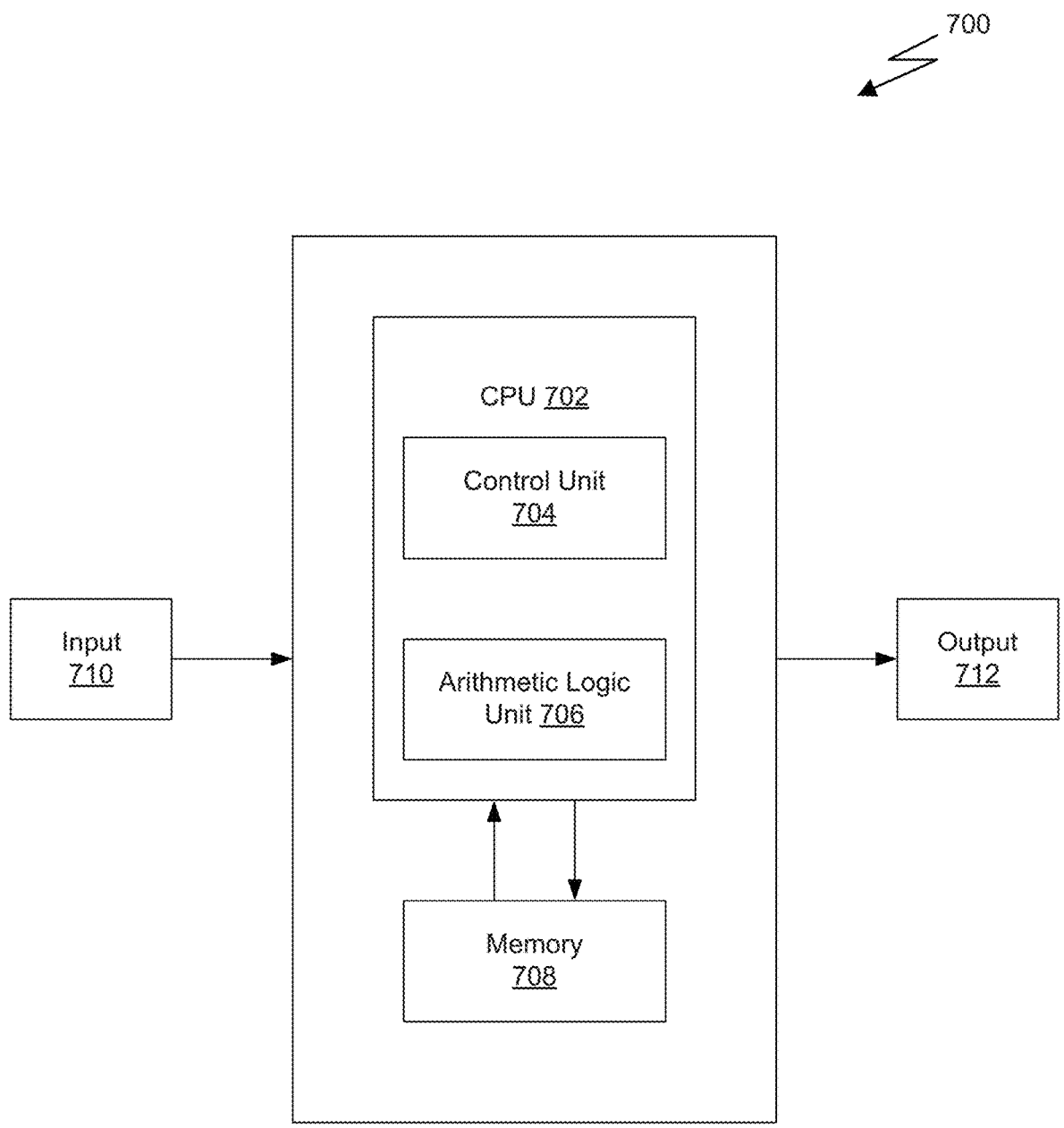
FIG. 7 illustrates an exemplary computer system, in accordance with some embodiments.

FIG. 7 illustrates an exemplary computer system 700, in accordance with some embodiments. The controller 610, as shown in FIG. 6, may be implemented by the computer system 700 as depicted in FIG. 7. The computer system 700 may include one or more CPUs 702, which includes control unit 704 that directs operation of the processor, and arithmetic logic unit 706 that carry out arithmetic and logic operations. The computer 700 also includes a volatile memory 708 (e.g., DRAM) to store data, and input 710 and output 712 peripherals to receive measurement data and send out control and tuning signals.

It will be appreciated that the computer system 700 can include additional components including, e.g., a non-volatile memory such as a hard disk drive (HDD), solid state drive (SDD), Flash memory, graphics processing unit (GPU), network interface controller (NIC), and the like.

In some embodiments, the computer system 700 is a programmable logic controller (PLC). The input 710 and output 720 can be I/O modules attached to the PLC.

Figure 8A:
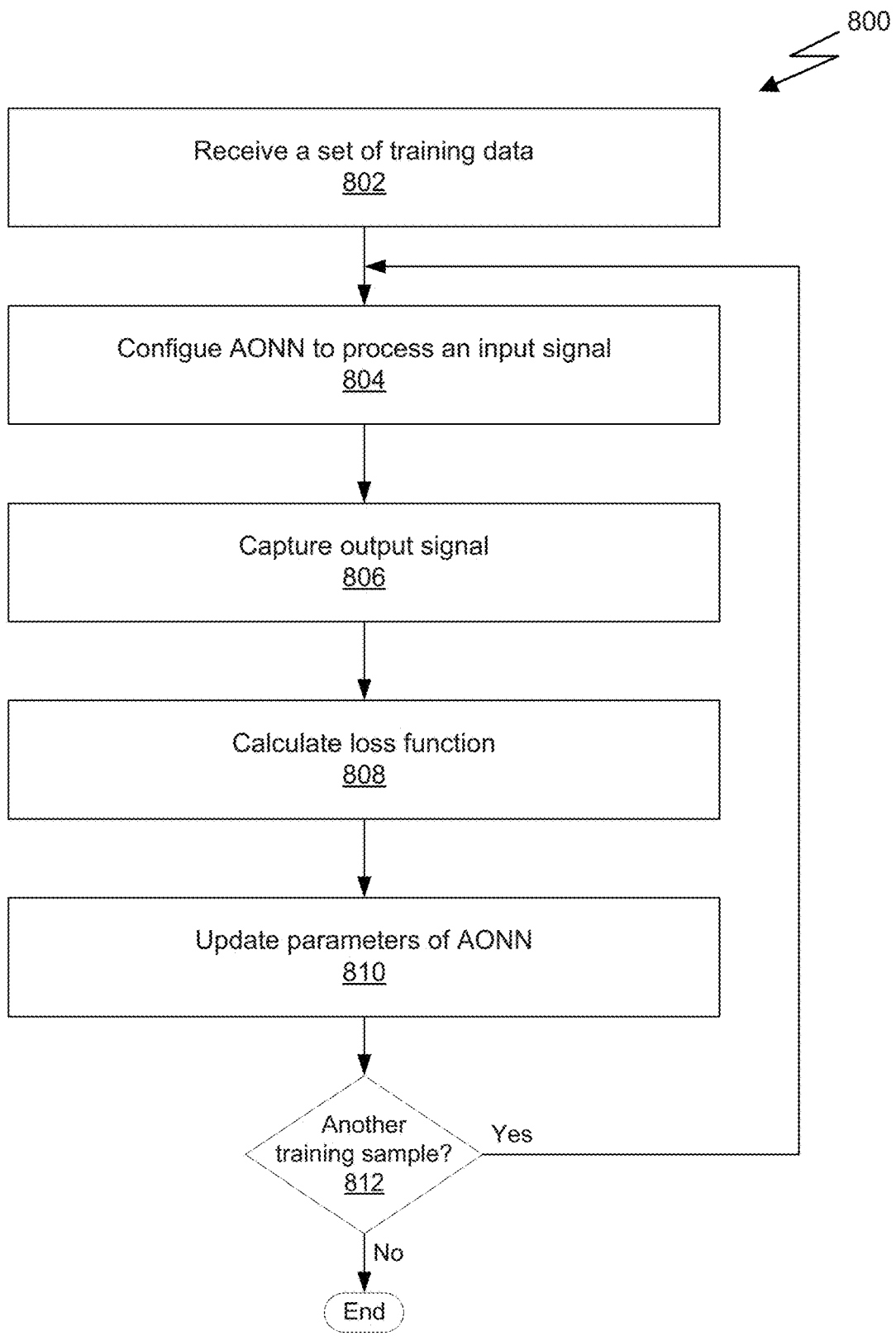
FIG. 8A illustrates a flowchart of a method for training the all-optical neural network, in accordance with some embodiments.

FIG. 8A illustrates a flowchart of a method for training the AONN, in accordance with some embodiments. With conventional computer-implemented neural networks, the neural network can be trained using a training data set. The training data set (i.e., set of training data) includes various instances of sample input signals and corresponding target output signals. Each instance of the input signal is processed by the neural network and the output signal is compared against the target output signal to calculate a value representing the difference based on a loss function. The value for the difference is then minimized by adjusting the parameters of the neural network in various ways, such as by gradient descent (e.g., backpropagation). These techniques are well known for conventional neural networks.

At step 802, a set of training data is received. The training data includes a plurality of instances of input signals provided to the input layer of the AONN and ground-truth target output signals generated by the output layer of the AONN. For example, in an embodiment, the input signals are a vector of values that indicate a modulation level of the input laser beams for a plurality of optical neurons in the input layer of the AONN. The target output signal can include a vector of values that represent the desired intensity of the probe laser beam for each of a plurality of optical neurons in the output layer of the AONN.

At step 804, the input signal is processed by the AONN to generate an output signal. In an embodiment, the system 500 is configured to process each layer of the AONN sequentially utilizing a set of stored weights associated with the interface between each subsequent layer. Prior to the first training pass, the weights can be initialized utilizing random or pseudo-random values.

At step 806, the output signals from the output layer of the AONN are captured. In an embodiment, capturing the output signals involves sampling a photosensor disposed in the optical path after all layers of the AONN have been processed.

At step 808, a loss function is calculated. The loss function can take a variety of forms, such as an L1 loss (e.g., least absolute deviation) or an L2 loss (e.g., least square error). The goal is to minimize the value of the loss function over the entire training set by adjusting the weights associated with each layer of the AONN.

At step 810, the parameters of the AONN are updated. In an embodiment, conventional techniques for updating the weights can be employed such as utilizing backpropagation with gradient descent.

At step 812, if the training data set includes another training sample, then the process set forth by steps 804 through 810 can be repeated for the additional training sample, If the training set has been exhausted, then the training process is complete.

Step 804, set forth above, involves configuring one or more SLMs based on a set of parameters (e.g., weights, input signal levels, etc.) in order for the AONN to learn a function that translates the input signal into the desired output signal. With conventional neural networks implemented in digital logic executed by a processor, the accuracy of the calculation is not typically an issue. However, when these operations are performed in the optical medium, the accuracy is not perfect and, in fact, is not negligible. One technique for properly encoding the SLM relies on an iterative approach using the GSW algorithm.

Figure 8B:
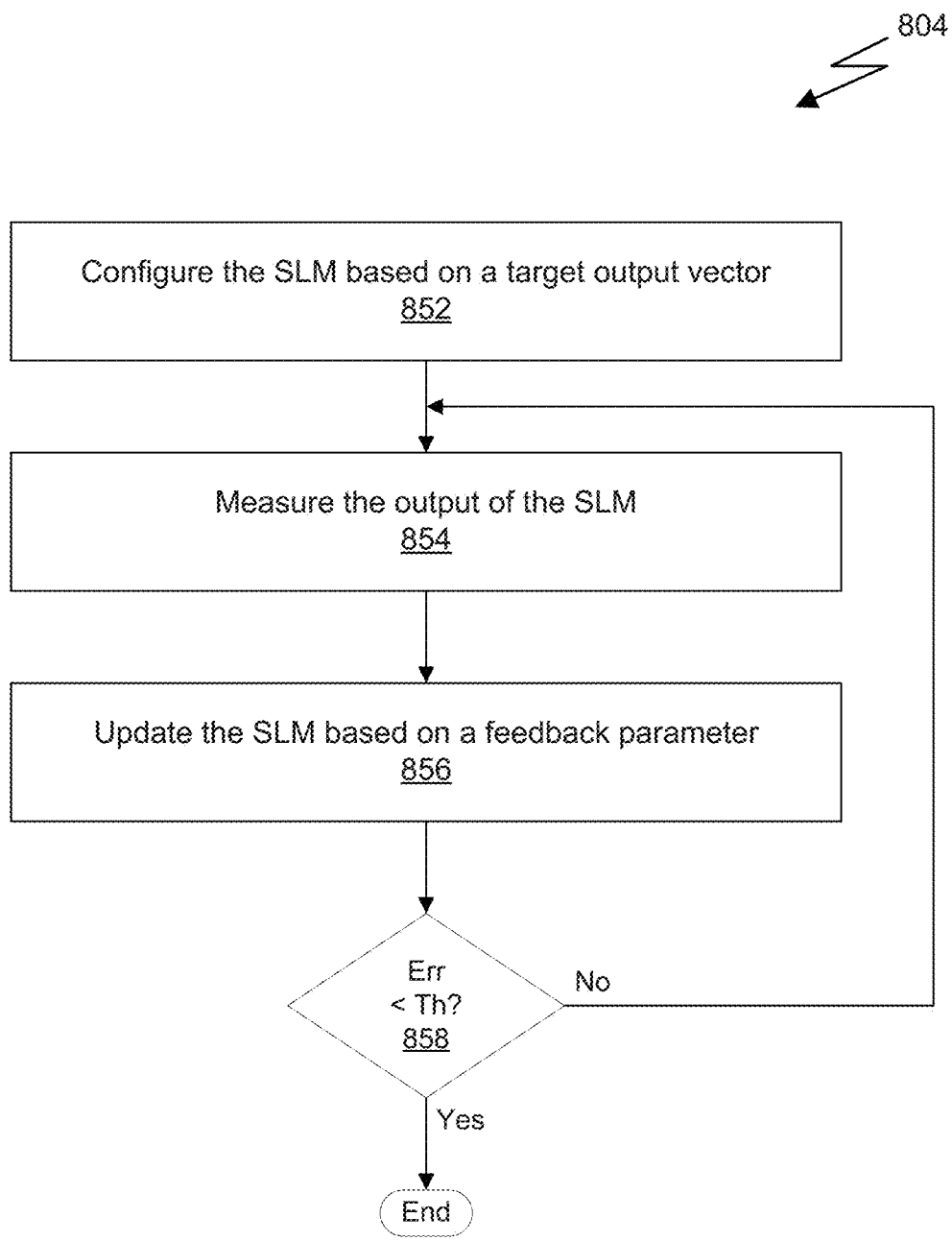
FIG. 8B illustrates a method for configuring an SLM using the weighted Gerchberg-Saxton algorithm, in accordance with some embodiments.

FIG. 8B illustrates a method for configuring an SLM using the weighted Gerchberg-Saxton (GSW) algorithm, in accordance with some embodiments. It will be appreciated that the linear operation depends, in some capacity, on the phase-difference of the light waves as combined by the optical lens. Two light sources will combine constructively or destructively due to interference based on their phase differences. Consequently, the encoded pattern of modulation for the SLM can be different than a target vector representing the desired modulated values. The difference is caused based on phase differences associated with light transmitted through or reflected from different pixels of the SLM due to different path lengths, optical aberrations in components, and the like. In order to compensate for these differences, an iterative process of configured the SLM and then measuring the resulting output can be employed to ensure the differences are reduced below an acceptable level.

At step 852, an SLM is configured based on a target output vector. In an embodiment, the SLM is initially configured by encoding the modulation signals for the different components of the SLM. The target output vector can represent the desired input signal levels to be generated by the SLM.

At step 854, the output of the SLM is measured. In an embodiment, a flip mirror and a photosensor can be used to capture the intensity of the signal generated by the SLM after the optical lens. It will be appreciated that the measured output might not be the same as the target output vector, again, due to phase differences of the different light sources, deflections of the optical path, and optical aberration in the various optical components.

At step 856, the SLM is updated based on a feedback parameter. In an embodiment, the encoded parameters are updated based on the following equation:

$$I'_t = g_n \sqrt{I_t}, g_n = \delta \frac{\sqrt{I_t}}{\sqrt{I_m}} g_{n-1} + (1 - \delta), g_1 = 1, \quad \text{(Eq. 4)}$$

where $I_t$ is the target output intensity, $I_m$ is the measured output intensity, and $g_n$ is the iterating vector (e.g., the updated encoding parameter for the SLM). The δ is a feedback parameter, such as 0.2, ranging from 0 to 1 that is used to control how fast the encoding parameter converges during a number of iterations. In other embodiments, other techniques for controlling the velocity of convergence can be utilized, e.g., $$g_n = g_{n-1}^{\frac{1}{\delta}},$$

where δ>1.

At step 858, an error is calculated and compared to a threshold. The error can be calculated as follows:

$$\epsilon_j = \left| \frac{I_{m,j} - I_{t,j}}{\frac{1}{n}\Sigma_k I_{t,k}} \right|, \quad \text{(Eq. 5)}$$

where j ranges from 0 to n. The iteration stops when the error is less than a threshold value (e.g., $\epsilon_j$<0.05). Otherwise, the method repeats steps 854 and 856 where another measurement is taken and the SLM is updated with the new iterating vector calculated in Eq. 4.

Figure 9:
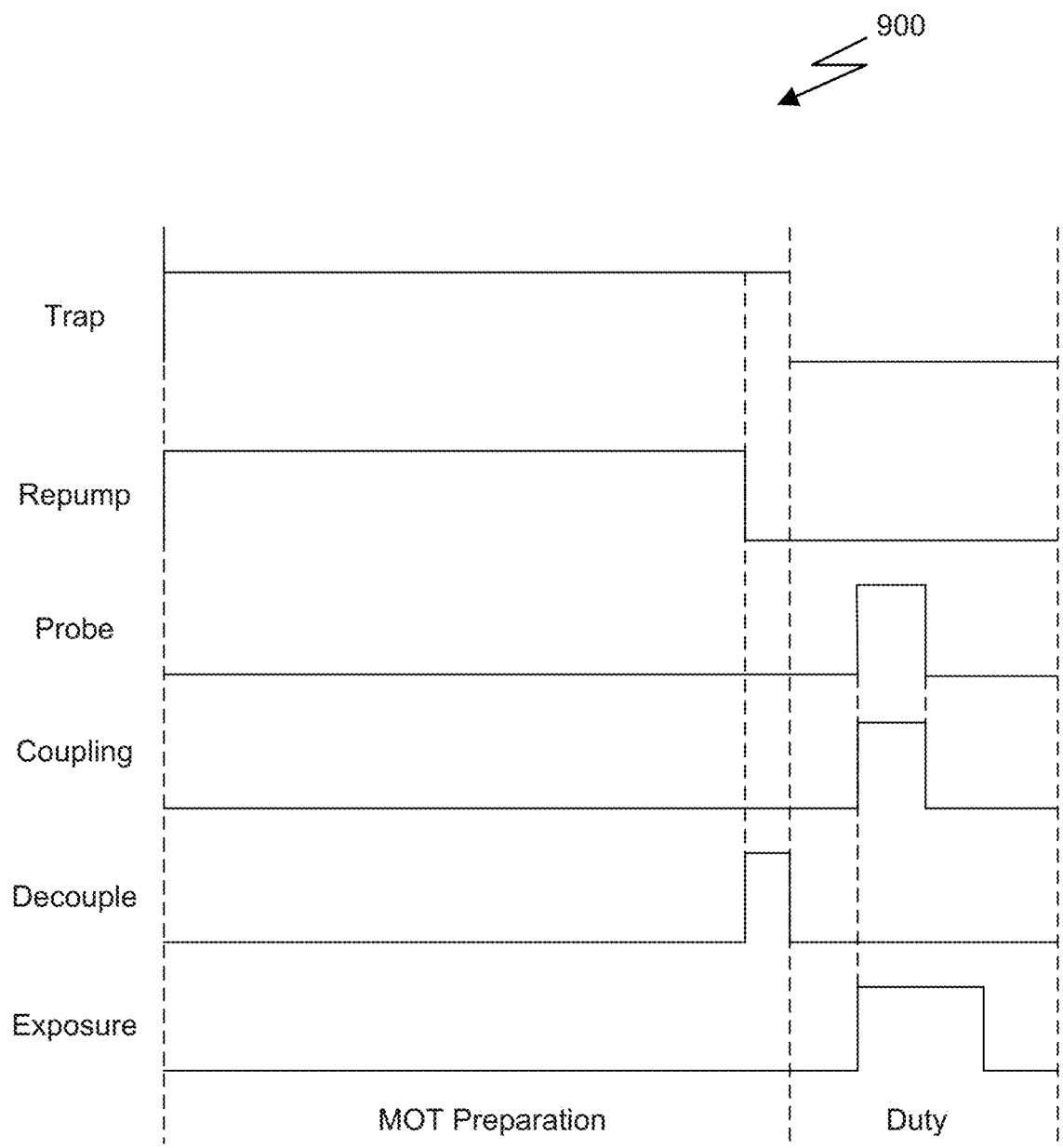
FIG. 9 illustrates a timing diagram sampling the system of FIG. 5, in accordance with some embodiments.

FIG. 9 illustrates a timing diagram for sampling the system 500, in accordance with some embodiments. Taking a measurement of the output signal (e.g., the probe laser transmission intensity across a 2D plane) requires a procedure to be followed in order to ensure the nonlinear optical medium is in the correct energy state at the start of the measurement. Although not shown explicitly in the Figures, the nonlinear optical medium, in some embodiments, can require additional trap and repump lasers. The trap laser is used to cool the particles in the nonlinear optical medium, and the repump laser is used to maintain particles in the cooling cycle. A decouple laser is also included and utilized after the cooling cycle to depopulate particles at the other ground state not relied on in the transition associated with the EIT characteristic.

In an embodiment, the cooling cycle begins by turning on the trap laser and the repump laser for a period of time. The period should be sufficient to allow the nonlinear optical medium to stabilize at a known state. An example of the duty cycle time is 100 ms. In an embodiment, the period of time is 88 ms, although the precise period of time can vary. The repump laser is turned off 50 μs prior to the end of the cooling cycle, at which point the trap laser is also turned off. Furthermore, as the repump laser is turned off, the decouple laser is turned on for 50 μs and a trigger is sent to a photosensor configured to capture the output signal.

After a short delay, depending on the response time of the photosensor to the trigger signal, at the end of the cooling cycle, the exposure is begun. The exposure time is set based on the dynamic range of the photosensor and the intensity of the coupling laser, among other factors in consideration. An example exposure time is shown as 2 ms. After the exposure is begun, the coupling laser and probe laser are turned on in order to perform the linear and nonlinear operations in the optical medium. The coupling laser and the probe laser can be turned on for, e.g., 880 μs, and there can be a delay between the start of the exposure and turning on or activating the coupling laser and the probe laser. Alternatively, the coupling laser and probe laser can be turned on prior to the start of the exposure. For example, as shown in FIG. 9, the probe laser and coupling laser are activated after the repump laser is deactivated.

The exposure is started in response to the trigger signal and is delayed based on an electronic delay in the logic of the photosensor. The precise timing of the exposure in relation to the sampling period (e.g., 12 ms) is not critical as long as the coupling laser and the probe laser are active during the exposure and the period of overlap is sufficient to reduce or minimize the signal to noise ratio (SNR) of the measured output signal. By reducing the active time during the exposure, the SNR can be decreased which can lead to less certainty in the measurement. Furthermore, the period of overlap may have a bearing on the dynamic range of the output signal, which can be limited by the characteristics of the photosensor. It will be appreciated that the timing diagram 900 is provided as a means of illustration for how a measurement can be taken to capture the result of the linear and nonlinear operations performed entirely within the optical medium. Other timing diagrams are possible depending on the exact configuration of the system 500.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system for implementing an optical neuron, the system comprising:
    a linear subsystem configured to perform an optical summation operation that combines one or more beams of light to generate a coupling beam of light as an intermediate signal, wherein the linear subsystem comprises:
        a first spatial light modulator (SLM) for modulating the one or more beams of light; and
        an optical lens that combines the one or more beams of light to generate the coupling beam of light; and
    a nonlinear subsystem configured to perform an optical nonlinear operation based on the coupling beam of light to generate an activation response signal, wherein the nonlinear subsystem includes a nonlinear optical medium that has an electromagnetically induced transparency (EIT) characteristic, and wherein the activation response signal comprises a probe beam of light transmitted through the nonlinear optical medium;
    wherein the nonlinear subsystem comprises a probe laser configured to generate the probe beam of light, wherein the probe beam of light is directed at the nonlinear optical medium, and the transmission of the probe beam of light through the nonlinear optical medium is controlled based on the coupling beam of light.

2. The system of claim 1, wherein the optical lens is configured to perform a Fourier transform.

3. The system of claim 2, wherein the optical lens generates at least two intermediate signals for two or more optical neurons by combining beams of light, each optical neuron corresponding to a particular propagating orientation, and each intermediate signal located at a different location on a focal plane of the optical lens.

4. The system of claim 1, further comprising:
    a second spatial light modulator (SLM) configured to modulate one or more additional beams of light by a set of weights to generate one or more weighted beams of light as the output of the optical neuron, wherein the one or more additional beams of light are split from the activation response signal.

5. The system of claim 4, wherein the second SLM is tuned using a weighted Gerchberg-Saxton (GSW) algorithm; and
wherein the system further comprises a photosensor configured to measure the output from the second SLM.

6. The system of claim 4, wherein the set of weights is learned by training a neural network based on a set of training data, and wherein the neural network includes an input layer, one or more hidden layers, and an output layer, and the set of weights is associated with an interface between the input layer and a hidden layer of the one or more hidden layers, a hidden layer of the one or more hidden layers and a subsequent hidden layer of the one or more hidden layers, or a hidden layer of the one or more hidden layers and the output layer.

7. The system of claim 1, wherein the transmission of the probe beam of light in the nonlinear optical medium is controlled by at least an intensity or a frequency of the coupling beam of light.

8. The system of claim 1, wherein the nonlinear optical medium comprises at least one of atoms, molecules, quantum dots, or solid-state materials in which a population of particles are controllable in one or more quantum or classical states.

9. The system of claim 1, wherein the optical lens is configured to generate two or more intermediate signals for two or more optical neurons by combining beams of light, wherein each intermediate signals of the two or more intermediate signals corresponds to a spot at a front focal plane, wherein each spot corresponds to a different optical neuron of the two or more optical neurons.

10. A system for implementing an all-optical neural network (AONN), the system comprising:
an input layer including one or more optical neurons; and
an output layer including one or more optical neurons,
wherein each optical neuron of the one or more optical neurons in the input layer and of the one or more optical neurons in the output layer comprises a linear subsystem and a nonlinear subsystem;
wherein the linear subsystem comprises:
a first spatial light modulator (SLM) for modulating one or more beams of light; and
an optical lens configured to combine the one or more beams of light to generate a coupling beam of light as an intermediate signal; and
wherein the nonlinear subsystem comprises:
a nonlinear optical medium that has an electromagnetically induced transparency (EIT) characteristic controlled by the coupling beam of light; and
a probe laser configured to generate a probe beam of light, wherein the probe beam of light is directed at the nonlinear optical medium, and wherein the transmission of the probe beam of light through the nonlinear optical medium is controlled based on the coupling beam of light.

11. The system of claim 10, wherein each optical neuron in the input layer is configured to receive one beam of light as an input to the optical neuron, and wherein each optical neuron in the output layer transmits one beam of light as an output of the optical neuron.

12. The system of claim 10, further comprising:
one or more hidden layers, wherein each hidden layer includes one or more optical neurons,
wherein each optical neuron in the input layer, a hidden layer of the one or more hidden layers, or the output layer further comprises:
a second spatial light modulator (SLM) for modulating an activation response signal output by the nonlinear subsystem for the optical neuron by a set of weights to generate weighted output signals as inputs for a subsequent layer of the AONN, wherein the activation response signal comprises the probe beam of light transmitted through the nonlinear optical medium that is nonlinearly controlled by the coupling beam of light.

13. The system of claim 12, wherein the system further comprises:
a photosensor configured to capture the weighted output signals generated by the second SLM; and
a light source configured to generate one or more additional beams of light in accordance with the weighted output signals to implement a subsequent layer of the AONN, wherein the subsequent layer is a hidden layer of the one or more hidden layers or the output layer.

14. The system of claim 13, wherein the first SLM is configured to spatially modulate at least one of an amplitude or a phase of a light beam incident on a surface of the first SLM.

15. The system of claim 14, wherein the first SLM is tuned using a weighted Gerchberg-Saxton (GSW) algorithm.

16. The system of claim 10, wherein the optical lens is configured to combine the one or more beams of light on a focal plane of the optical lens.

17. The system of claim 10, wherein the optical lens is configured to generate two or more intermediate signals for two or more optical neurons by combining beams of light, wherein each intermediate signals of the two or more intermediate signals corresponds to a spot at a front focal plane, wherein each spot corresponds to a different optical neuron of the two or more optical neurons.

* * * * *